United States Patent
Park

(10) Patent No.: US 11,108,281 B2
(45) Date of Patent: Aug. 31, 2021

(54) WIRELESS POWER RECEIVING DEVICE, WIRELESS POWER TRANSMITTING DEVICE, AND METHOD FOR CALIBRATING POWER USING THE SAME

(71) Applicant: LG ELECTRONICS INC., Seoul (KR)

(72) Inventor: Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/185,306

(22) Filed: Feb. 25, 2021

(65) Prior Publication Data
US 2021/0184513 A1    Jun. 17, 2021

Related U.S. Application Data

(63) Continuation of application No. PCT/KR2020/013484, filed on Oct. 5, 2020.

(30) Foreign Application Priority Data

Oct. 2, 2019 (KR) .................. 10-2019-0122594

(51) Int. Cl.
*H02J 50/80* (2016.01)
*H02J 50/10* (2016.01)
*H02J 50/40* (2016.01)

(52) U.S. Cl.
CPC .............. *H02J 50/80* (2016.02); *H02J 50/10* (2016.02); *H02J 50/40* (2016.02)

(58) Field of Classification Search
CPC ............. H02J 50/80; H02J 50/10; H02J 50/40
(Continued)

(56) References Cited

U.S. PATENT DOCUMENTS

2010/0001845 A1* 1/2010 Yamashita .......... H02J 7/00302
340/10.4
2013/0002036 A1* 1/2013 Kamata .................. H02J 50/40
307/104
(Continued)

FOREIGN PATENT DOCUMENTS

KR      20170140685      12/2017
KR      20190000363      1/2019
(Continued)

OTHER PUBLICATIONS

PCT International Application No. PCT/KR2020/013484, International Search Report dated Jan. 12, 2021, 3 pages.

*Primary Examiner* — Alfonso Perez Borroto
(74) *Attorney, Agent, or Firm* — Lee, Hong, Degerman, Kang & Waymey

(57) ABSTRACT

A wireless power transmitter according to one embodiment of the present disclosure transmits wireless power to a wireless power receiver, receives a first received power packet including an estimated received power value indicating a first calibration data point from the wireless power receiver after a negotiation phase, transmits ACK in response to the first received power packet, receives a second received power packet including an estimated received power value indicating a second calibration data point from the wireless power receiver, transmits ACK in response to the second received power packet, receives a new second received power packet including an estimated received power value indicating a third calibration data point from the wireless power receiver, transmits ACK in response to the new second received power packet, and constructs a power calibration curve using the first received power packet, the second received power packet, and the new second received power packet.

20 Claims, 23 Drawing Sheets

(58) Field of Classification Search
USPC .......................................................... 307/149
See application file for complete search history.

(56) References Cited

U.S. PATENT DOCUMENTS

| | | | |
|---|---|---|---|
| 2013/0062961 A1* | 3/2013 | Park ........................ | H02J 50/40 |
| | | | 307/104 |
| 2014/0091641 A1* | 4/2014 | Ichikawa ................ | B60L 53/36 |
| | | | 307/104 |
| 2016/0211703 A1* | 7/2016 | Eguchi .................... | H02J 50/40 |
| 2017/0047786 A1* | 2/2017 | Park ........................ | H02J 7/025 |
| 2019/0052128 A1* | 2/2019 | Van Wageningen .... | H02J 50/80 |
| 2020/0044474 A1* | 2/2020 | Baysinger ............... | H02J 50/00 |

FOREIGN PATENT DOCUMENTS

| | | |
|---|---|---|
| KR | 20190050301 | 5/2019 |
| KR | 20190087033 | 7/2019 |

* cited by examiner

FIG. 3B

|  | b7 | b6 | b5 | b4 | b3 | b2 | b1 | b0 |
|---|---|---|---|---|---|---|---|---|
| Byte 0 | colspan="8" | Application Profile ||||||||
| Byte 1 | Version ||||||||
| Byte 2-N-1 | Profile-specific data ||||||||

FIG. 13

|  | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved ||||| Mode |||
| $B_1$ | (msb) ||||||||
| $B_2$ | Estimated Received Power value ─────────────── (lsb) ||||||||

WIRELESS POWER RECEIVING DEVICE, WIRELESS POWER TRANSMITTING DEVICE, AND METHOD FOR CALIBRATING POWER USING THE SAME

CROSS-REFERENCE TO RELATED APPLICATION

This application is a continuation of International Application No. PCT/KR2020/013484, filed on Oct. 5, 2020, which claims the benefit of earlier filing date and right of priority to Korean Patent Application No. 10-2019-0122594 filed on Oct. 2, 2019, the contents of which is hereby incorporated by reference herein in its entirety.

BACKGROUND OF THE DISCLOSURE

Field of the Disclosure

The present disclosure relates to a wireless power transmitting device, a wireless power receiving device receiving wireless power from the wireless power transmitting device, and a method for calibrating power.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

SUMMARY

A technical object of the present disclosure is to provide a wireless power transmitting device capable of detecting a foreign object more accurately between the wireless power transmitting device and a wireless power receiving device, the wireless power receiving device, and a method for calibrating power using the devices.

Technical objects to be achieved by the present disclosure are not limited to the aforementioned technical objects, and other technical objects not described above may be evidently understood by a person having ordinary skill in the art to which the present disclosure pertains from the following description.

To solve the problem above, a wireless power transmitting device according to one embodiment of the present disclosure is a wireless power transmitting device transmitting wireless power to a wireless power receiving device; and receives a first received power packet including an estimated received power value fora first calibration data point from the wireless power receiving device after a negotiation phase, transmits ACK in response to the first received power packet, receives a second received power packet including an estimated received power value fora second calibration data point from the wireless power receiving device, transmits ACK in response to the second received power packet, receives a new second received power packet including an estimated received power value fora third calibration data point from the wireless power receiving device, transmits ACK in response to the new second received power packet, and constructs a power calibration curve based on the first received power packet, the second received power packet, and the new second received power packet.

To solve the problem above, a wireless power receiving device according to one embodiment of the present disclosure is a wireless power receiving device receiving wireless power from a wireless power transmitting device; and transmits a first received power packet including an estimated received power value fora first calibration data point to the wireless power transmitting device after a negotiation phase, receives ACK in response to the first received power packet from the wireless power transmitting device, transmits a second received power packet including an estimated received power value fora second calibration data point to the wireless power transmitting device, receives ACK in response to the second received power packet from the wireless power transmitting device, transmits a new second received power packet including an estimated received power value fora third calibration data point to the wireless power transmitting device, and receives ACK in response to the new second received power packet from the wireless power transmitting device.

To solve the problem above, a wireless power receiving device according to one embodiment of the present disclosure is a wireless power receiving device receiving wireless power from a wireless power transmitting device; and transmits a first received power packet including an estimated received power value fora first calibration data point to the wireless power transmitting device after a negotiation phase, receives ACK in response to the first received power packet from the wireless power transmitting device, transmits a second received power packet including an estimated received power value fora second calibration data point to the wireless power transmitting device, receives ACK in response to the second received power packet from the wireless power transmitting device, and based on change of a target operating point, transmits a new second received power packet including an estimated received power value fora third calibration data point to the wireless power transmitting device or transmits a new first received power packet including an estimated received power value fora new first calibration data point and a new second received power packet including an estimated received power value indicating a new second calibrated data point to the wireless power transmitting device.

Other specific matters of the present disclosure are included in the detailed description and drawings.

Advantageous Effects

According to the present disclosure, a foreign object between a wireless power transmitting device and a wireless power receiving device may be detected more accurately.

The effects according to the present disclosure is not limited by the contents exemplified above, and more various effects are included in the present disclosure.

BRIEF DESCRIPTION OF THE DRAWINGS

FIG. 3b shows an example of a WPC NDEF in a wireless power transfer system.

FIG. 13 illustrates a format of a received power packet according to one embodiment.

DESCRIPTION OF EXEMPLARY EMBODIMENTS

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDDCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
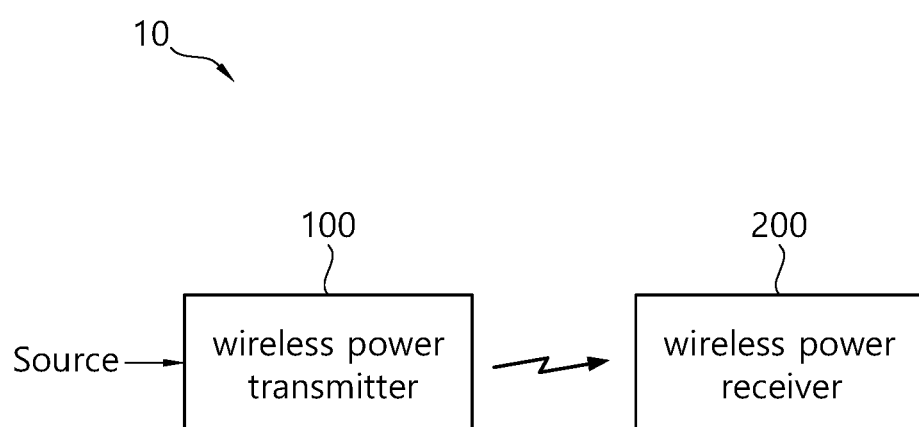
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and soon, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
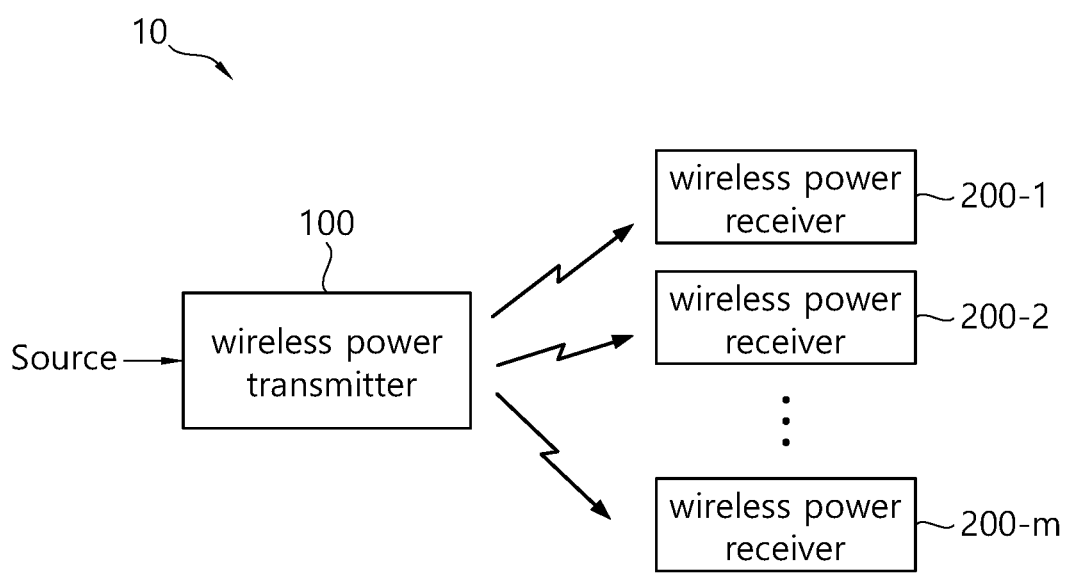
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
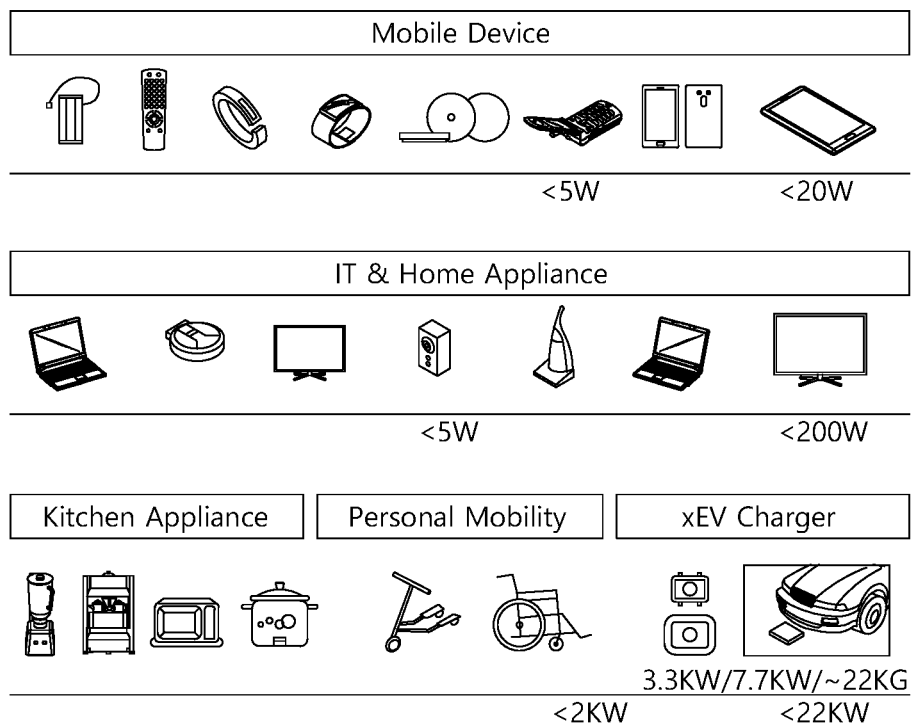
FIG. 3a shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3a, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs.

Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ### hotel. Select "Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 3b shows an example of a WPC NDEF in a wireless power transfer system.

Referring to FIG. 3b, the WPC NDEF may include, for example, an application profile field (e.g., 1B), aversion field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1× Category 1 | 1× Category 1 |
| Class 2 | 10 W | 1× Category 3 | 2× Category 2 |
| Class 3 | 16 W | 1× Category 4 | 2× Category 3 |
| Class 4 | 33 W | 1× Category 5 | 3× Category 3 |
| Class 5 | 50 W | 1× Category 6 | 4× Category 3 |
| Class 6 | 70 W | 1× Category 7 | 5× Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4:
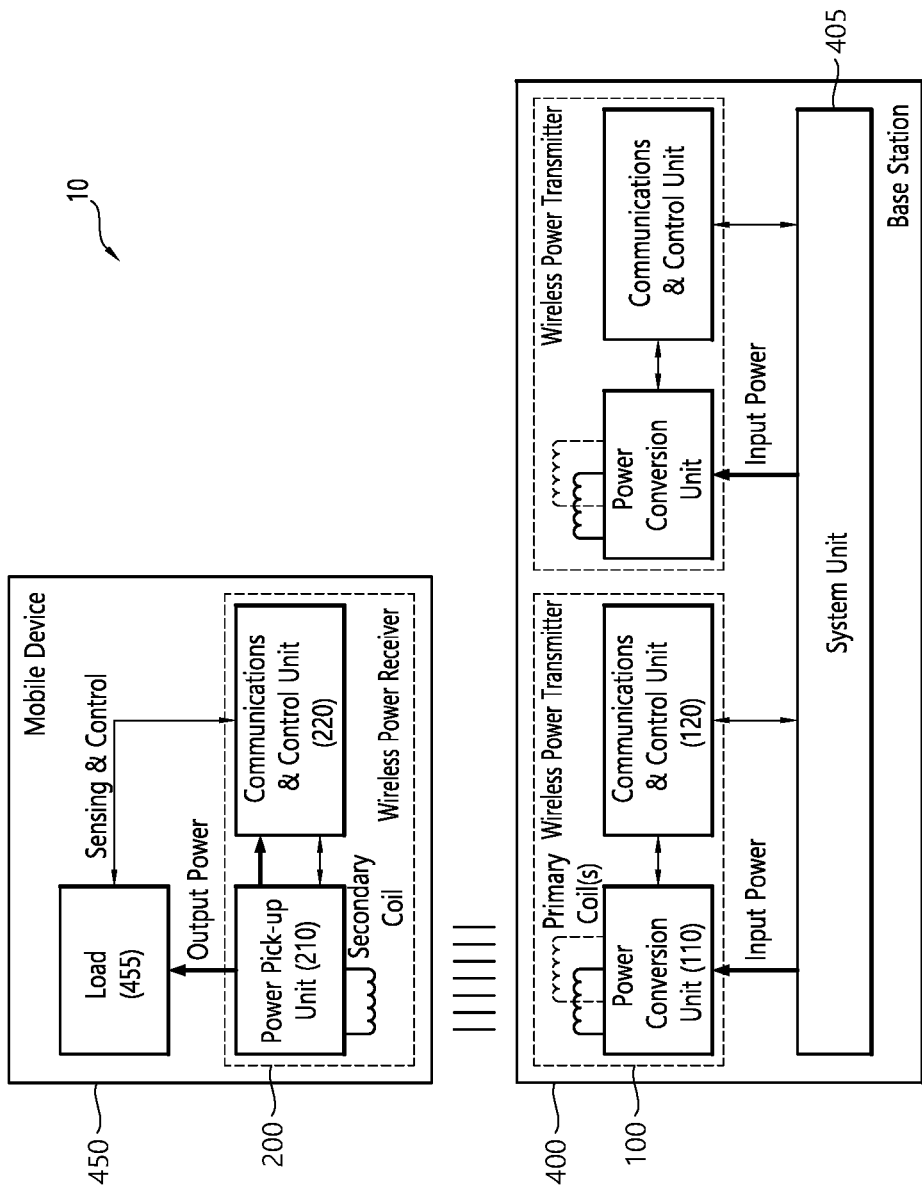
FIG. 4 is a block diagram of a wireless power transfer system according to another exemplary embodiment of the present disclosure.

FIG. 4 is a block diagram of a wireless power transfer system according to another exemplary embodiment of the present disclosure.

Referring to FIG. 4, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4a, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying(FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Hereinafter, the coil or coil unit includes a coil and at least one device being approximate to the coil, and the coil or coil unit may also be referred to as a coil assembly, a coil cell, or a cell.

Figure 5:
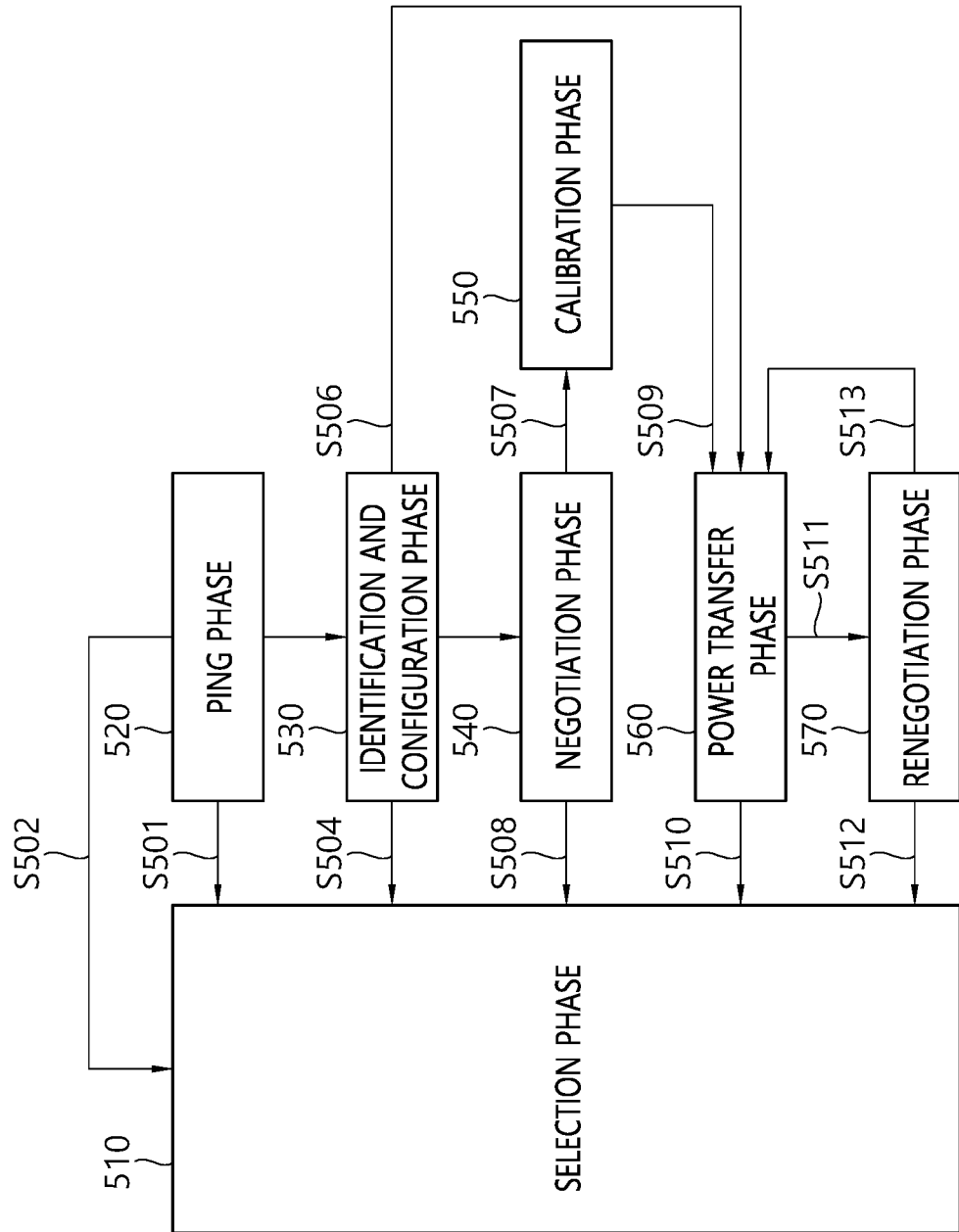
FIG. 5 is a state transition diagram for describing a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
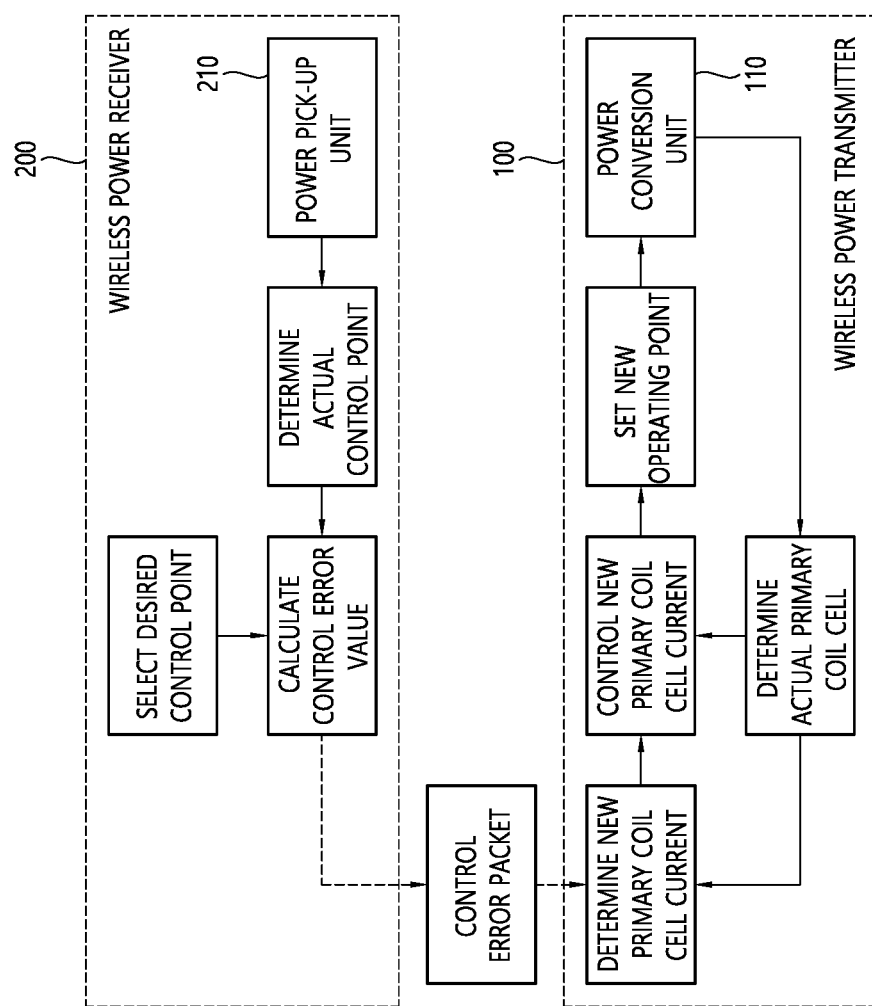
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point —amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
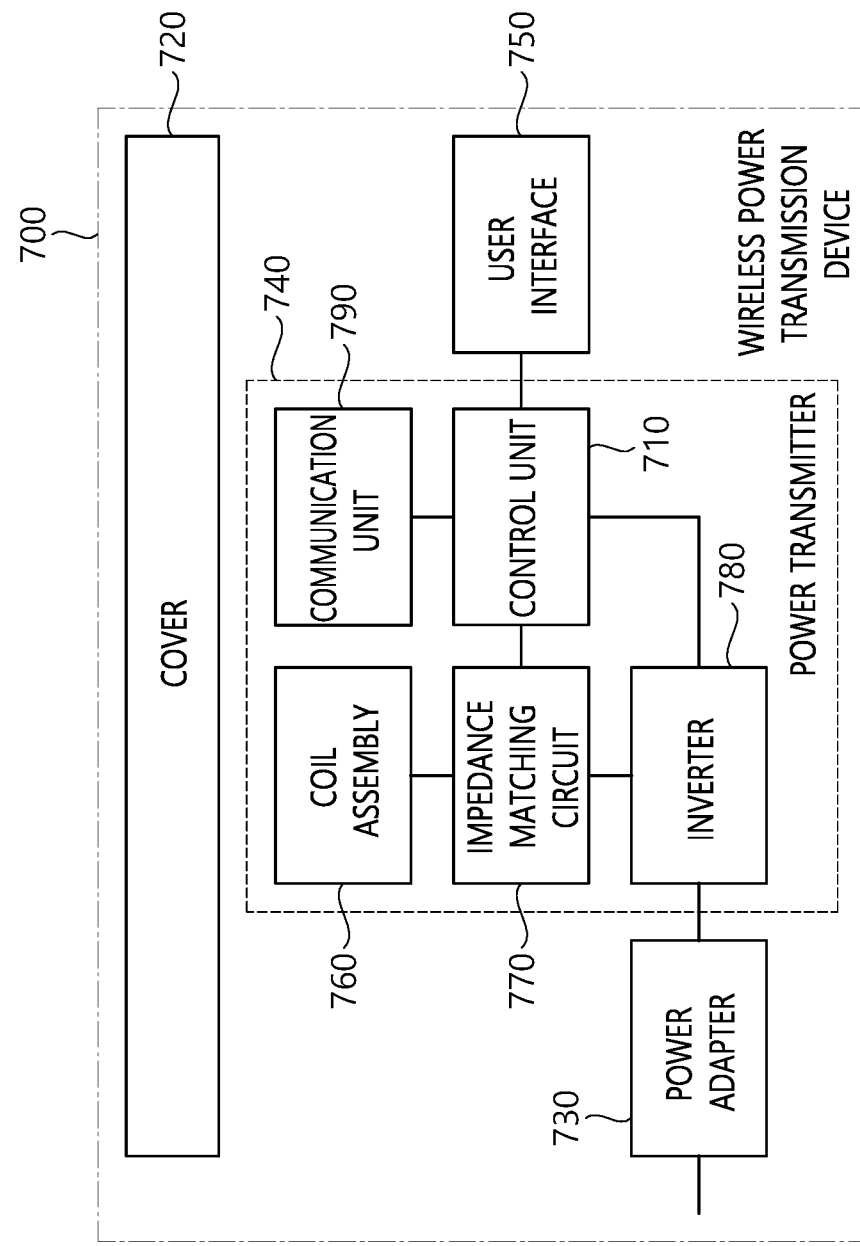
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
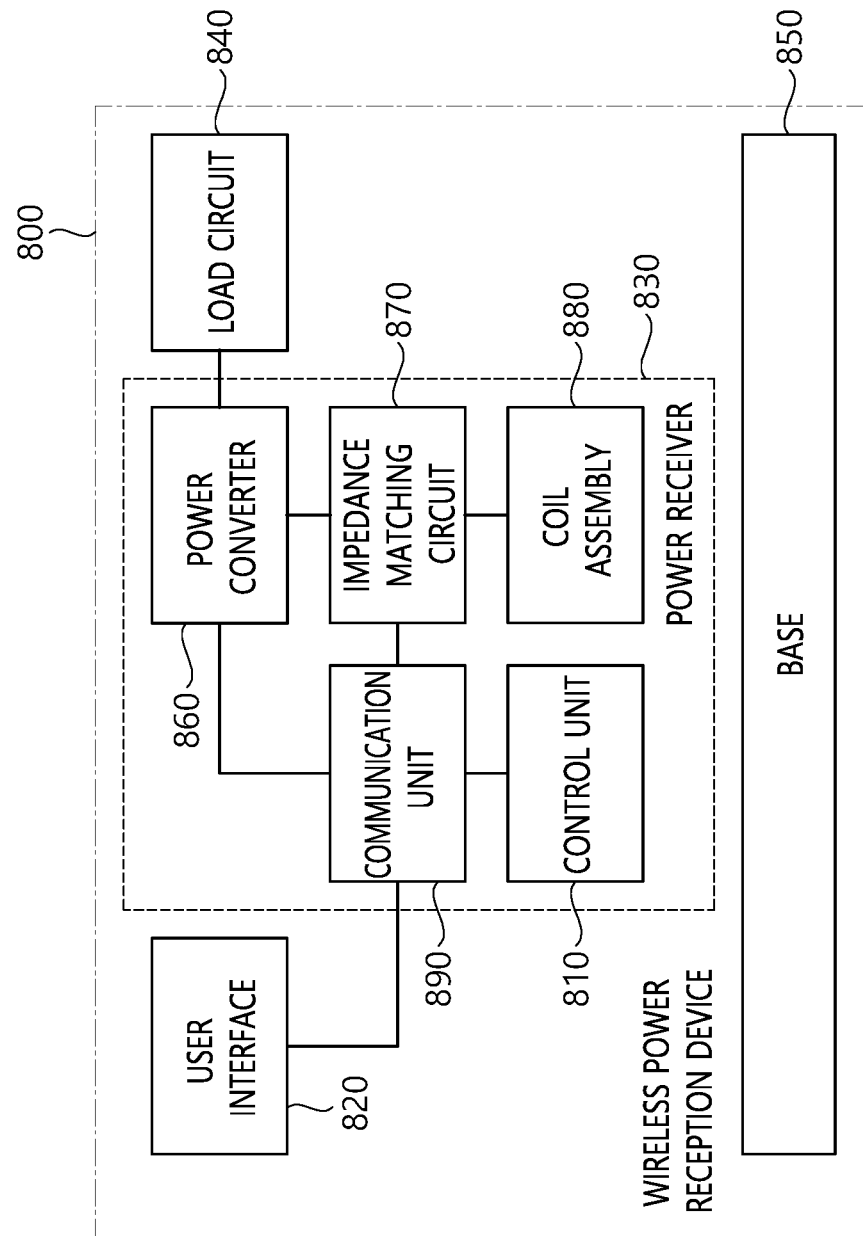
FIG. 8 is a block diagram of a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
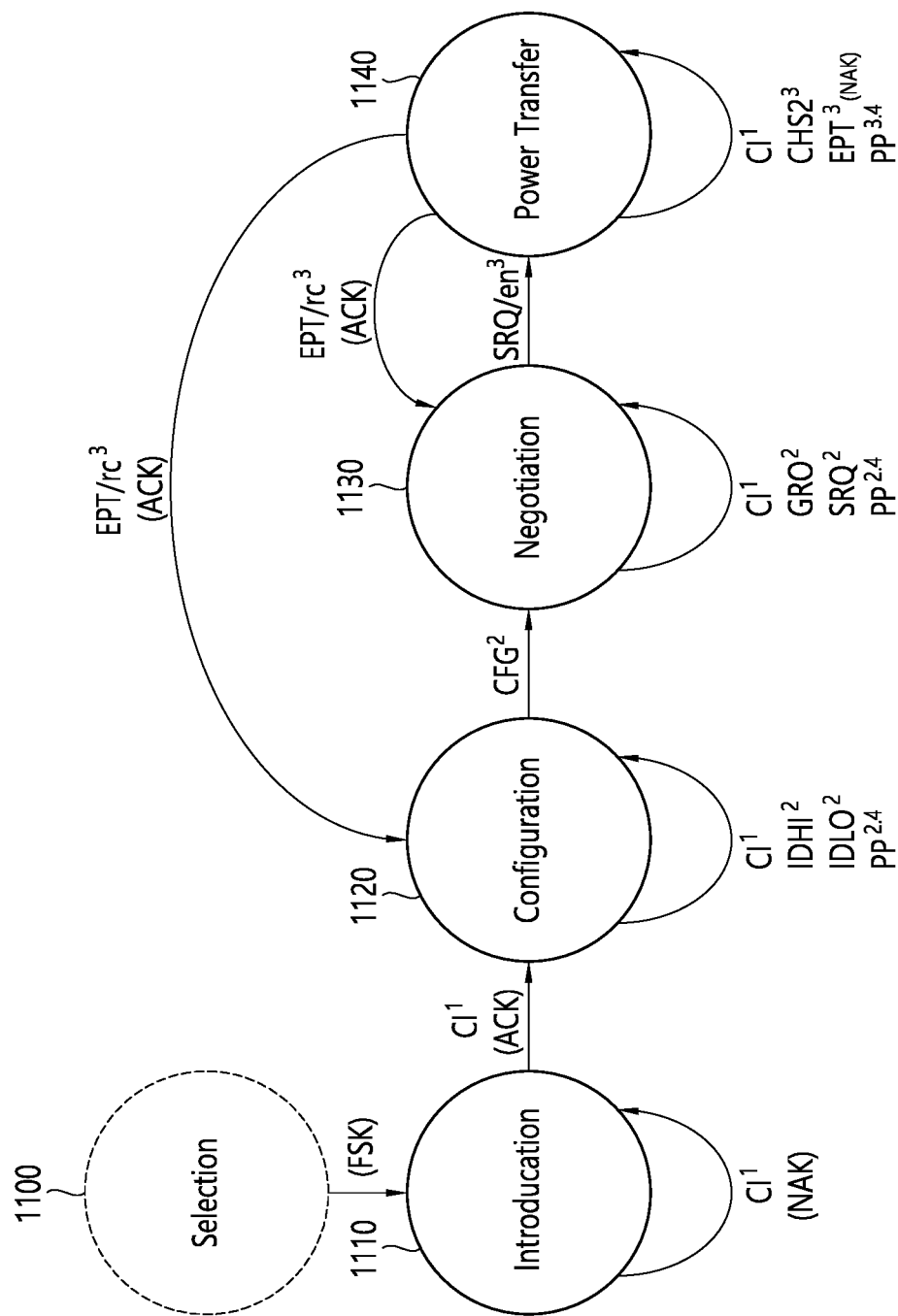
FIG. 9 shows operation statuses of a wireless power transmitter and a wireless power receiver in a shared mode according to an exemplary embodiment of the present disclosure.

FIG. 9 shows operation statuses of a wireless power transmitter and a wireless power receiver in a shared mode according to an exemplary embodiment of the present disclosure.

Referring to FIG. 9, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the exemplary embodiment of the present disclosure may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power receiver enters the configuration phase. If the wireless power transmitter transmits a NAK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

Hereinafter, authentication between a wireless power transmitting device and a wireless power receiving device will be disclosed.

Suppose a foreign object lies between a wireless power receiving device and a wireless power transmitting device when the wireless power transmitting device transmits wireless power to the wireless power receiving device. In this case, the foreign object absorbs part of the magnetic field. In other words, the foreign object receives part of the wireless power transmitted by the wireless power transmitting device, and the wireless power receiving device receives the remaining wireless power. In terms of power transmission efficiency, as much transmission power is lost as the power or energy absorbed by the foreign object. As described above, since a causal relationship may be established between the existence of a foreign object and a power loss ($P_{loss}$), the wireless power transmitting device may detect the foreign object based on how much power loss occurs. The foreign object detection method above may be referred to as a power loss-based foreign object detection method.

The power lost due to the foreign object may be defined as a value obtained by subtracting actual power received by the wireless power receiving device ($P_{received}$) from the power transmitted by the wireless power transmitting device ($P_{transmitted}$). Since the wireless power transmitting device already knows the power ($P_{transmitted}$) that it has transmitted, the power loss may be calculated once the wireless power transmitting device knows the actual power received by the wireless power receiving device ($P_{received}$). To this end, the wireless power receiving device may periodically transmit a received power data packet (RP) to the wireless power transmitting device to inform the wireless power transmitting device of the power received by the wireless power receiving device ($P_{received}$).

Meanwhile, although the wireless power transmitting device and the wireless power receiving device are composed of various circuit components inside and constitute separate devices, since the devices perform wireless power transmission through magnetic coupling between them, they constitute one wireless power transmission system. Power transmission characteristics uniquely determine the amount of power transmitted by the wireless power transmitting device (transmitted power) and the amount of power received by the wireless power receiving device (received power). For example, the power transmission characteristics may be described by a ratio or a function of transmitted power and received power. Therefore, knowing the power transmission characteristics in advance, the wireless power transmitting device may predict the amount of power received by the wireless power receiving device from the wireless power transmitted by the wireless power transmitting device. Suppose actual received power reported by the wireless power receiving device is less than the received power predicted based on the power transmission characteristics; in this case, it may be considered that power loss has occurred during the power transmission process. A power loss-based foreign object detection method may determine that a foreign object exists in such a case. In such a case, a power loss-based foreign object detection method may determine that a foreign object exists. In this way, since the power loss used to detect a foreign object is also determined based on the power transmission characteristics, it is necessary to properly understand the power transmission characteristics to increase the reliability of foreign object detection.

The power transmission characteristics depend on the environment or inherent factors of the device that transmits wireless power. The wireless power transmitting and receiving devices may generally use power calibration at the start of wireless power transmission to grasp power transmission characteristics in any given wireless charging environment. When power transmission characteristics are identified or configured by power calibration, foreign object detection may be performed accordingly.

The power transmission characteristics may also depend on the change of a load or change of strength of magnetic coupling. For example, when the wireless power receiving device employs multiple load steps or a varying load (or an increasing load) or when the strength of magnetic coupling changes due to change of positions of the wireless power transmitting and receiving devices, at least part of the power transmission characteristics may change. When at least part of the power transmission characteristics changes, at least part of the power calibration parameters configured according to the previous power transmission characteristics become invalid. Also, power loss and foreign object detection according to at least part of the configured power calibration parameters are no longer valid. Therefore, additional power calibration suitable for the changed power transmission characteristics is needed.

At the time of foreign object detection due to power loss, the accuracy of a received power value transmitted periodically by the wireless power receiving device through a received power packet is essential; the WPC Qi specification requires accuracy as high as shown in Table 3.

TABLE 3

| Estimated Received Power | $\Delta P_r$ | Unit |
|---|---|---|
| $P_{r(est)} \leq 5$ W | 350 | mW |
| 5 W $< P_{r(est)} \leq 10$ W | 500 | mW |
| 10 W $< P_{r(est)}$ | 750 | mW |

Referring to Table 3, when the wireless power receiving device receives wireless power of more than 5 W, the resolution of a received power value required for the wireless power receiving device is larger than 500 mW. Therefore, there arises a problem that a foreign object consuming power less than 500 mW may not be detected with the resolution mentioned above.

To compensate for the accuracy of a received power value during transmission and reception of wireless power of more than 5 W, a two-point power calibration method is used.

Figure 10:
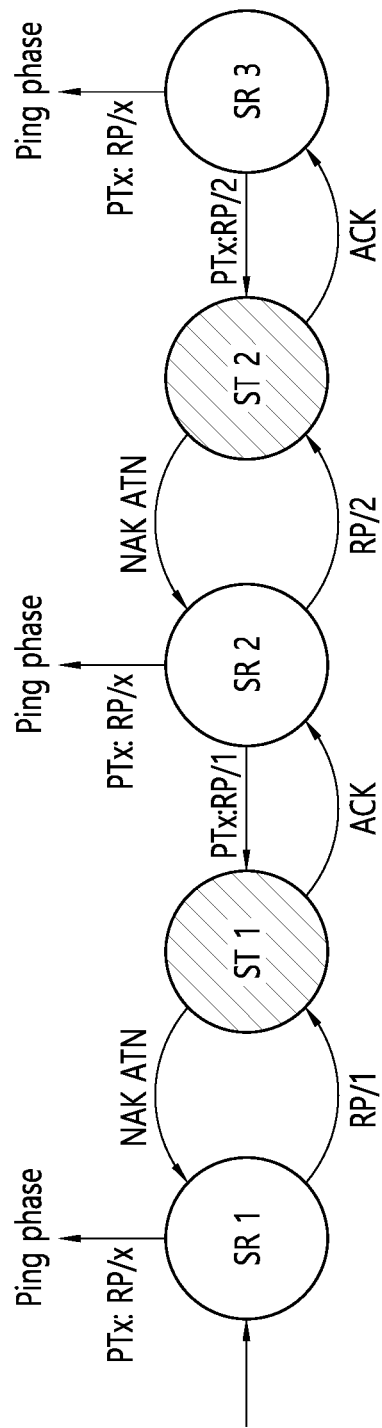
FIG. 10 is a state diagram illustrating a two-point power calibration method.
Figure 11:
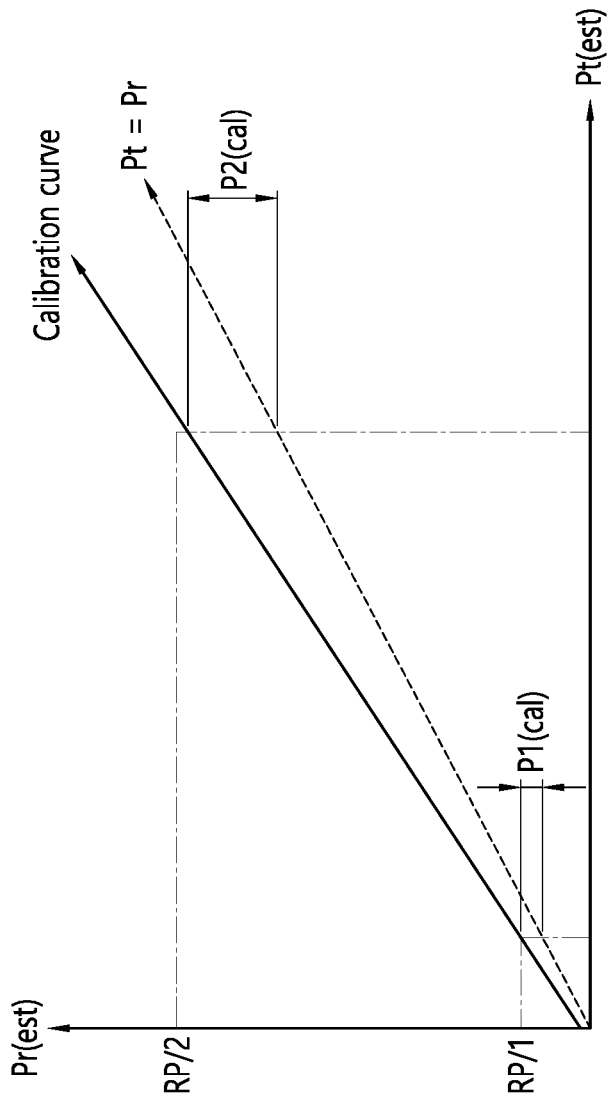
FIG. 11 is a graph illustrating a power calibration curve according to a two-point power calibration method.

FIG. 10 is a state diagram illustrating a two-point power calibration method, and FIG. 11 is a graph illustrating a power calibration curve according to the two-point power calibration method.

Referring to FIG. 10, after completing the negotiation phase, a wireless power receiving device transmits a first received power packet (RP/1) and a second received power packet (RP/2) at the start of the power transmission step to let a wireless power transmitting device construct a two-point power calibration curve.

More specifically, the wireless power receiving device transmits the first received power packet (RP/1) including information about a first calibration data point to the wireless power transmitting device SR1.

The first received power packet (RP/1) includes a mode field and an estimated received power value field (see FIG. 13). The wireless power transmitting device may confirm, through the value of the mode field of the first received power packet (RP/1), that a received power packet (RP) received from the wireless power receiving device is the first received power packet (RP/1) including the information about the first calibration data point and confirm the first calibration data point through the value of the estimated received power value field of the first received power packet (RP/1).

The first calibration data point is the start point of the power calibration curve and may be a power level corresponding to about 10% of a reference power level of a power transfer contract established at the negotiation phase and may be a received power value received by the wireless power receiving device under a light load condition. The light load condition may indicate a situation in which a load (for example, battery) is not connected electrically to the wireless power receiving device.

Meanwhile, the wireless power receiving device transmits a Control Error (CE) packet to the wireless power transmitting device, where the CE packet includes a control error value. The control error value includes information about a deviation between a target operating point and an actual operating point of the wireless power receiving device. For example, when the CE value is positive, it indicates that the actual operating point is lower than the target operating point, and the wireless power transmitting device receiving the CE value increases the power of wireless power transmitted. On the other hand, if the CE value is negative, it indicates that the actual operating point is higher than the target operating point, and the wireless power transmitting device receiving the CE value lowers the power of wireless power transmitted.

The wireless power transmitting device determines, based on a control error value included in the CE packet, whether the wireless power receiving device has reached a desired target operating point and responds with ACK or NAK in response to the first received power packet (RP/1) ST1. More specifically, the wireless power transmitting device determines, based on a control error value, whether the power level is stable at the first calibration data point. For example, when the control error value is less than 3, the wireless power transmitting device may determine that the power level is stable and the wireless power receiving device has reached the desired target operating point; and respond with ACK in response to the first received power packet (RP/1). When the control error value is larger than 3, the wireless power transmitting device may determine that the power level is unstable and the wireless power receiving device has not yet reached the desired target operating point; and respond with NAK in response to the first received power packet (RP/1).

The wireless power receiving device continues to transmit the first received power packet (RP/1) until it receives ACK from the wireless power transmitting device SR1. Also, to stabilize the power level at the first calibration data point, the wireless power receiving device also transmits a control error packet repeatedly to the wireless power transmitting device.

After the power level is stabilized at the first calibration data point and ACK is received in response to the first received power packet (RP/1) from the wireless power transmitting device, the wireless power receiving device transmits a second received power packet (RP/2) including information about a second calibration data point to the wireless power transmitting device SR2.

The second received power packet (RP/2) also includes a mode field and an estimated received power value field (see FIG. 13). The wireless power transmitting device may confirm, through the value of the mode field of the second received power packet (RP/2), that a received power packet (RP) received from the wireless power receiving device is the second received power packet (RP/2) including the information about the second calibration data point and confirm the second calibration data point through the value of the estimated received power value field of the second received power packet (RP/2).

The second calibration data point may be used to construct a power calibration curve, correspond to a power level close to a reference power level of a power transfer contract established in the negotiation phase, and indicate a received power value received by the wireless power receiving device under a connected load condition. The connected load condition may indicate a situation in which a load is connected to the wireless power receiving device.

The wireless power transmitting device determines, based on a control error value included in the CE packet, whether the wireless power receiving device has reached a desired target operating point and responds with ACK or NAK in response to the second received power packet (RP/2) ST2. More specifically, the wireless power transmitting device determines, based on a control error value, whether the power level is stable at the second calibration data point. For example, when the control error value is less than 3, the wireless power transmitting device may determine that the power level is stable and the wireless power receiving device has reached the desired target operating point; and respond with ACK in response to the second received power packet (RP/2). When the control error value is larger than 3, the wireless power transmitting device may determine that the power level is unstable and the wireless power receiving device has not yet reached the desired target operating point; and respond with NAK in response to the second received power packet (RP/2).

The wireless power receiving device continues to transmit the second received power packet (RP/2) until it receives ACK from the wireless power transmitting device SR2. Also, to stabilize the power level at the second calibration data point, the wireless power receiving device also transmits a control error packet repeatedly to the wireless power transmitting device.

After the power level is stabilized at the second calibration data point and ACK is received in response to the second received power packet (RP/2) from the wireless power transmitting device SR3, the wireless power receiving device and the wireless power transmitting device enter a normal power transmission mode. The wireless power transmitting device may construct a power calibration curve based on the first received power packet (RP/1) and the second received power packet (RP/2) in response to which ACK is transmitted and check occurrence of power loss due to a foreign object during power transmission based on the power calibration curve.

More specifically, the wireless power transmitting device may receive a received power packet (for example, RP/0) from the wireless power receiving device during power transmission, confirm the received power value received by the wireless power receiving device through the received power packet, and assume occurrence of a power loss due to a foreign object if a difference between received power values confirmed through the ratio of a received power value to a received power packet calculated by applying a transmitted power value to the power calibration curve.

In what follows, with reference to FIG. 11, a power calibration curve according to the two-point power calibration method will be described.

A wireless power transmitting device constructs a power calibration curve based on the first received power packet (RP/1) and the second received power packet (RP/2) in response to which ACK is transmitted.

Suppose a prediction value of transmitted power is denoted by $P_{t(est)}$, a prediction value of received power is denoted by $P_{r(est)}$, an actual transmitted power value is denoted by $P_t$, and an actual received power value is denoted by $P_r$; if it is confirmed that there exists no foreign object between the wireless power transmitting device and the wireless power receiving device through Foreign Object Detection (FOD) before power transmission (pre-power FOD), Eq. 1 below is satisfied.

$$Pt(est)+\delta Pt=Pt=Pr=Pr(est)-\delta Pr \quad \text{[Eq.1]}$$

In Eq. 1, $\delta P_t$ is a prediction error value of transmitted power and may include a power loss inherent to the wireless power transmitting device. $\delta P_r$ is a prediction error value of received power and may include a power loss inherent to the wireless power receiving device.

Based on Eq. 1, a calibrated power value $P_{(cal)}$ may be calculated by Eq. 2 below.

$$P(cal)=\delta Pt+\delta Pr=Pr(est)-Pt(est) \quad \text{[Eq.2]}$$

Therefore, if RP/1 (the first calibration data point) and RP/2 (the second calibration data point) are inserted to Eq. 2, calibrated power values may be expressed respectively by using Eq. 3.

$$P1(cal)=RP/1-Pt1(est)$$

$$P2(cal)=RP/2-Pt2(est) \quad \text{[Eq.3]}$$

In other words, if it is confirmed from pre-power FOD that no foreign object is present, a relationship described by Eqs. 1 to 3 is established, and a calibration curve based on Eqs. 1 to 3 may be constructed as shown in FIG. 11.

A calibration protocol using the two points (RP/1 and RP/2) is incapable of supporting the case where the wireless power receiving device reaches final load power through multiple steps. Therefore, a multi-point based power calibration method is needed.

According to the WPC Qi ver 1.2.4, only one transmission of calibration information (RP/1 and RP/2) is allowed before power transmission is started; thus, when the wireless power receiving device changes an operating point (for example, a target rectified voltage) during power transmission, the wireless power transmitting device is unable to generate a new calibration curve during power transmission.

According to the WPC Qi ver 1.2.4, when re-calibration of power is needed, the wireless power receiving device has to reset the wireless power transmitting device by transmitting an EPT/rep packet and restart the protocol for wireless power transmission from the beginning. Therefore, a problem occurs that the wireless power receiving device has to stop receiving power for re-calibration of power. Therefore, a multi-point based power recalibration method is required during power transmission.

Also, RP/2 power level (the second calibration data point) may be limited depending on the battery charge state when the wireless power receiving device transmits the second received power packet (RP/2). In particular, when the battery is almost fully charged, a difference between RP/1 (the first calibration data point) and RP/2 (the second calibration data point) becomes small, which makes the power calibration range limited. In addition, when high power transmission is required as the amount of battery charge is decreased due to the operation of various application programs during power transmission, since the calibration power itself lies outside the range of the initial calibration curve, there is a problem that the calibration curve has to be extrapolated. Therefore, to prevent extrapolation, there is a need for a method capable of transmitting additional calibration points to the wireless power transmitting device to extend the existing calibration curve while maintaining an operating point (for example, a target rectified voltage) during charging. In other words, a multi-point calibration method is required to extend the calibration curve using multiple points.

In what follows, a multi-point power calibration method that extends a power calibration curve will be described.

Figure 12:
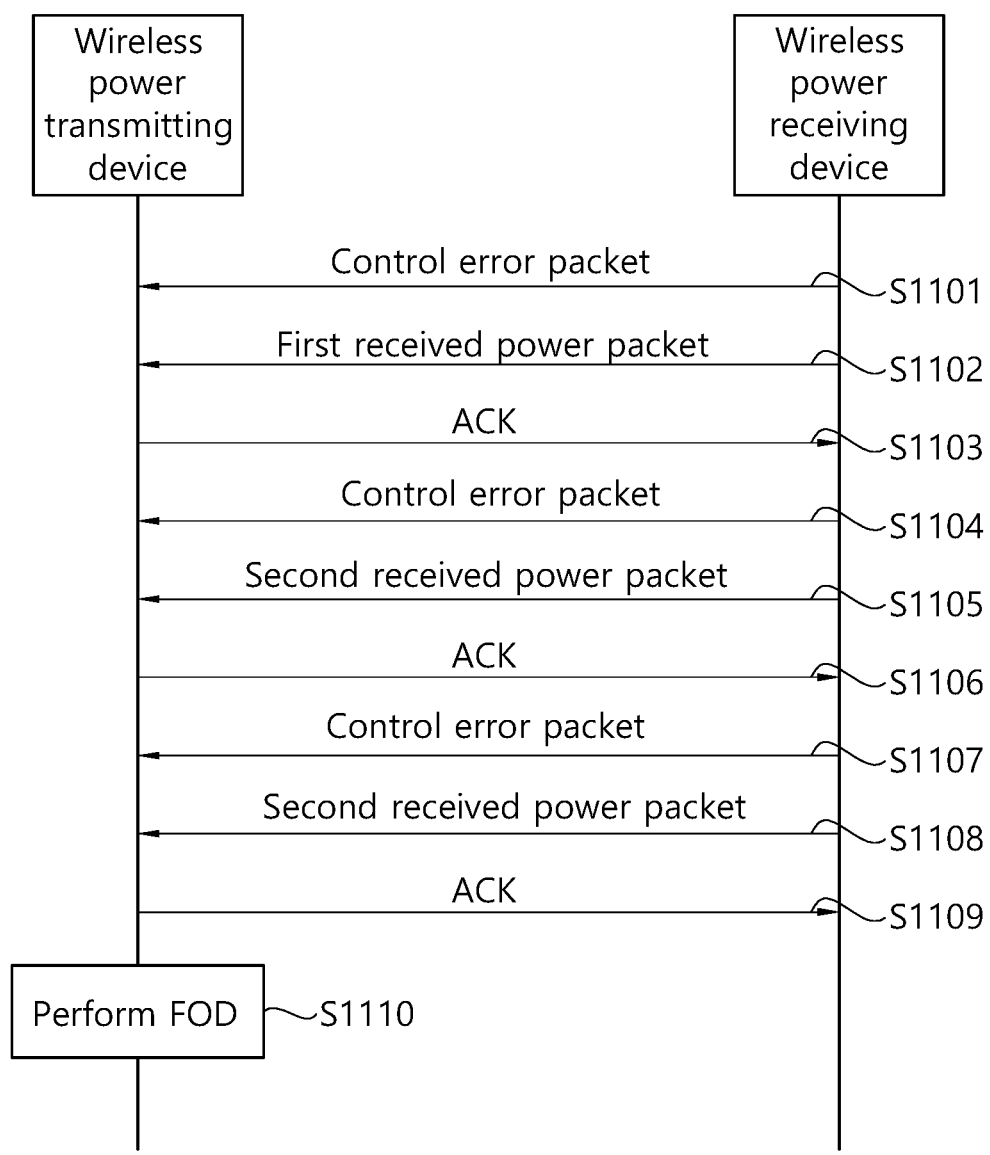
FIG. 12 is a flow diagram illustrating a multi-point power calibration method according to one embodiment.
Figure 14:
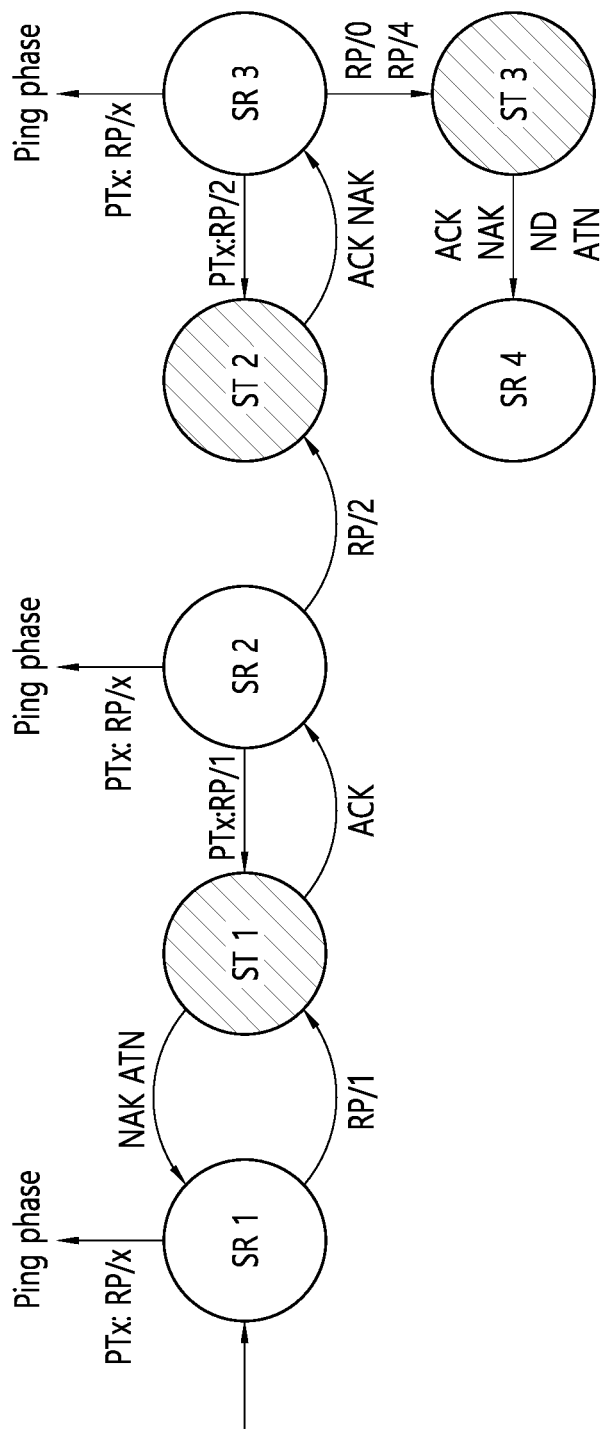
FIG. 14 is a state diagram illustrating a multi-point power calibration method using a plurality of RP/2s according to one embodiment.
Figure 15:
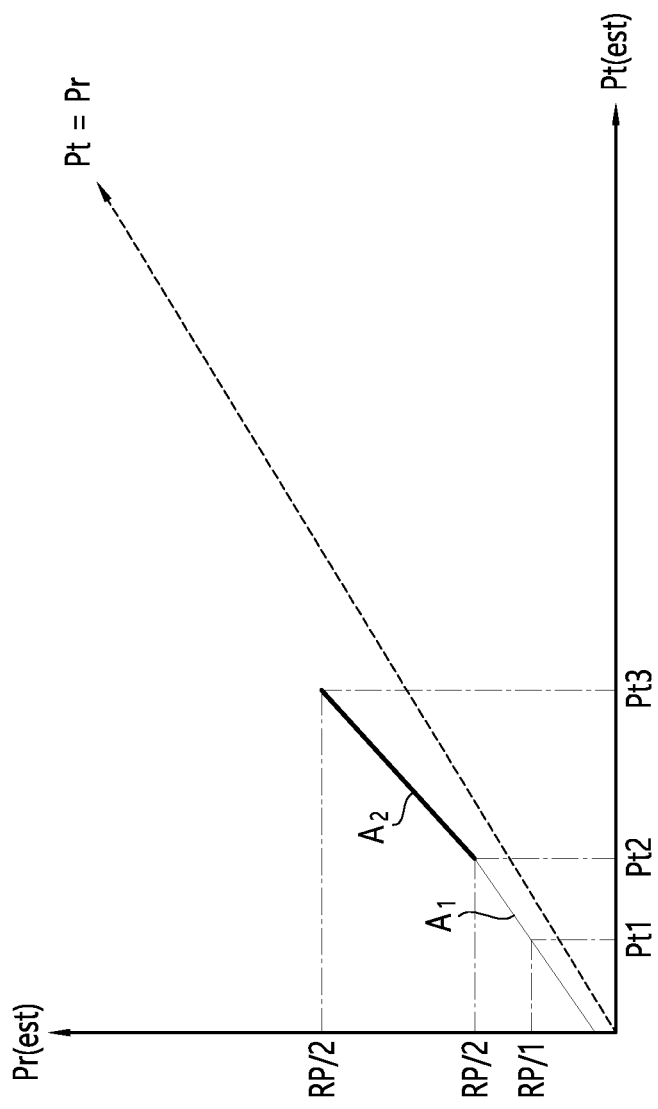
FIG. 15 is a graph illustrating a power calibration curve according to a multi-point power calibration method using a plurality of RP/2s according to one embodiment.
Figure 16:
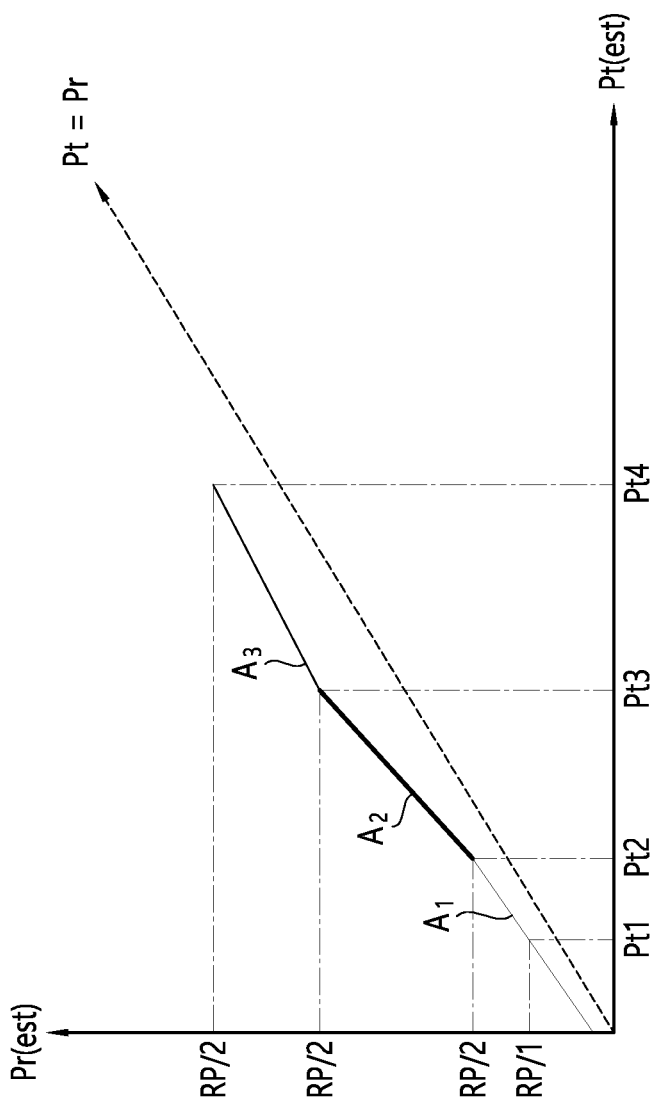
FIG. 16 is a graph illustrating a power calibration curve according to a multi-point power calibration method using a plurality of RP/2s according to another embodiment.

FIG. 12 is a flow diagram illustrating a multi-point power calibration method according to one embodiment, FIG. 13 illustrates a format of a received power packet according to one embodiment, FIG. 14 is a state diagram illustrating a multi-point power calibration method using a plurality of RP/2s according to one embodiment, FIG. 15 is a graph illustrating a power calibration curve according to a multi-point power calibration method using a plurality of RP/2s according to one embodiment, and FIG. 16 is a graph illustrating a power calibration curve according to a multi-point power calibration method using a plurality of RP/2s according to another embodiment.

Referring to FIG. 12, according to a multi-point power calibration protocol that extends a power calibration curve, a wireless power receiving device transmits a CE packet to a wireless power transmitting device S1101. Since the CE packet has been already described above, specific descriptions thereof will be omitted.

Referring to FIGS. 12 and 14, the wireless power receiving device transmits a first received power packet (RP/1) including information about a first calibration data point to the wireless power transmitting device S1102, SR1. The CE packet and the first received power packet (RP/1) are transmitted after the negotiation phase, which may be transmitted at the start of the power transfer phase or before the power transfer phase.

Referring to FIG. 13, the first received power packet (RP/1) includes a mode field and an estimated received power value field. The wireless power transmitting device may confirm, through the value of the mode field of the first received power packet (RP/1), that a received power packet (RP) received from the wireless power receiving device is the first received power packet (RP/1) including the information about the first calibration data point and confirm the first calibration data point through the value of the estimated received power value field of the first received power packet (RP/1).

The first calibration data point is the start point of the power calibration curve and may be a power level corresponding to about 10% of a reference power level of a power transfer contract established at the negotiation phase and may be a received power value received by the wireless power receiving device under a light load condition. The light load condition may indicate a situation in which a load (for example, battery) is not connected electrically to the wireless power receiving device.

The wireless power transmitting device determines, based on a control error value included in the CE packet, whether the wireless power receiving device has reached a desired target operating point and responds with ACK or NAK in response to the first received power packet (RP/1) ST1. More specifically, when the control error value is less than or equal to a predetermined level, the wireless power transmitting device determines that the power level is stable and the wireless power receiving device has reached a desired target operating point; and responds with ACK in response to the first received power packet (RP/1) S1103. When the control error value is larger than or equal to a predetermined level, the wireless power transmitting device determines that the power level is unstable and the wireless power receiving device has not yet reached a desired target operating point; and may respond with NAK in response to the first received power packet (RP/1).

The wireless power receiving device continues to transmit the first received power packet (RP/1) until it receives ACK from the wireless power transmitting device S1102. Also, to stabilize the power level at the first calibration data point, the wireless power receiving device also transmits a control error packet repeatedly to the wireless power transmitting device S1101.

After receiving ACK from the wireless power transmitting device in response to the first received power packet (RP/1), the wireless power receiving device transmits a second received power packet (RP/2) including information about the second calibration data point to the wireless power transmitting device S1105, SR2.

Referring to FIG. 13, the second received power packet (RP/2) also includes a mode field and an estimated received power value field (see FIG. 13). The wireless power transmitting device may confirm, through the value of the mode field of the second received power packet (RP/2), that a received power packet (RP) received from the wireless power receiving device is the second received power packet (RP/2) including the information about the second calibration data point and confirm the second calibration data point through the value of the estimated received power value field of the second received power packet (RP/2). In order for the wireless power transmitting device to distinguish the first calibration data point from the second calibration data point, the mode field of the first received power packet (RP/1) and the mode field of the second received power packet (RP/2) have different values. For example, the mode field of the first received power packet (RP/1) may have a value of 1 ('001'b), and the mode field of the second received power packet (RP/2) may have a value of 2 ('010'b).

The second calibration data point may be used to construct a power calibration curve, correspond to a power level close to a reference power level of a power transfer contract established in the negotiation phase, and indicate a received power value received by the wireless power receiving device under a connected load condition. The connected load condition may indicate a situation in which a load is connected to the wireless power receiving device.

Meanwhile, the wireless power receiving device transmits a CE packet to the wireless power transmitting device S1104. The wireless power transmitting device determines, based on a control error value included in the CE packet, whether the wireless power receiving device has reached a desired target operating point and responds with ACK or NAK in response to the second received power packet (RP/2) ST2. When the control error value is less than or equal to a predetermined level, the wireless power transmitting device determines that the power level is stable and the wireless power receiving device has reached a desired target operating point; and responds with ACK in response to the second received power packet (RP/2) S1106. When the control error value is larger than or equal to a predetermined level, the wireless power transmitting device determines that the power level is unstable and the wireless power receiving device has not yet reached a desired target operating point; and may respond with NAK in response to the second received power packet (RP/2).

The wireless power receiving device continues to transmit the second received power packet (RP/2) until it receives ACK from the wireless power transmitting device S1105. Also, to stabilize the power level at the second calibration data point, the wireless power receiving device also transmits a control error packet repeatedly to the wireless power transmitting device S1104.

After receiving ACK in response to the second received power packet (RP/2), the wireless power receiving device may determine whether it is necessary to transmit consecutive calibration data points. For example, the wireless power receiving device may check whether a desired target load power has been reached or whether new calibration data points outside the range between the first calibration data point and the second calibration data point are required while an operating point (for example, $V_{rec}$ (a rectified voltage)) is maintained. In other words, when the target load power is not reached yet, the wireless power receiving device may check whether step-by-step increments to the target load power are required and whether new calibration data points outside the range between the first calibration data point and the second calibration data point are required considering the change of a use environment of a battery being charged.

When transmission of consecutive calibration points is not required, the wireless power receiving device may transmit a received power packet (RP/0 or RP/4), of which the mode field has a value different from those of the first received power packet (RP/1) and the second received power packet (RP/2), so that the power calibration protocol may be terminated and normal power transmission may resume SR3. The wireless power receiving device may transmit RP/0 or RP/4 to avoid calibration time-out so that the power calibration protocol may be terminated. Referring to FIG. 13, RP/0 or RP/4 may also have the same format as those of the first received power packet (RP/1) and the second received power packet (RP/2) and includes an estimated received power value indicating a normal value. Since RP/0 or RP/4 has a mode field whose value is different from those of the first received power packet (RP/1) and the second received power packet (RP/2), the wireless power transmitting device may distinguish RP/0 or RP/4 from RP/1 and RP/2.

When transmission of consecutive calibration points is required, the wireless power receiving device may transmit a third calibration point, one of the consecutive calibration points, to the wireless power transmitting device using the second received power packet (RP/2) again. In other words, the wireless power receiving device transmits a new second received power packet (RP/2) including information about the third calibration point to the wireless power transmitting device S1108, SR3.

The third calibration data point is used to construct a power calibration curve and may be a power value higher than the second calibration data point to which the wireless power transmitting device has responded with ACK or a power value lower than the first calibration data point to which the wireless power transmitting device has responded with ACK.

Meanwhile, the wireless power receiving device transmits a CE packet to the wireless power transmitting device S1107. The wireless power transmitting device determines, based on a control error value included in the CE packet, whether the wireless power receiving device has reached a desired target operating point and responds with ACK or NAK in response to the new second received power packet (RP/2) ST2. When the control error value is less than or equal to a predetermined level, the wireless power transmitting device determines that the power level is stable and the wireless power receiving device has reached a desired target operating point; and responds with ACK in response to the new second received power packet (RP/2) S1109. When the control error value is larger than or equal to a predetermined level, the wireless power transmitting device determines that the power level is unstable and the wireless power receiving device has not yet reached a desired target operating point;

and may respond with NAK in response to the new second received power packet (RP/2).

The wireless power receiving device continues to transmit the new second received power packet (RP/2) until it receives ACK from the wireless power transmitting device S1108. Also, to stabilize the power level at the third calibration data point, the wireless power receiving device also transmits a control error packet repeatedly to the wireless power transmitting device S1107.

Referring to FIG. 15, the wireless power transmitting device constructs a power calibration curve based on calibration data points included respectively in the first received power packet (RP/1), the second received power packet (RP/2), and the new second received power packet (RP/2) in response to which ACK is transmitted.

When the power calibration curve is constructed based on three calibration data points, a first power calibration curve A1 connecting the first calibration data point (Pt1, RP/1) and the second calibration data point (Pt2, RP/2) and a second power calibration curve A2 connecting the second calibration data point (Pt2, RP/2) and the third calibration data point (Pt3, RP/2) may be constructed.

The first power calibration curve A1 and the second power calibration curve A2 may be defined as first-order functions having different slopes and y-intercepts, and the wireless power transmitting device performs foreign object detection due to a loss of transmitted power using a received power value confirmed by using a received power packet received from the wireless power receiving device, a transmitted power value, and a power calibration curve including the first power calibration curve A1 and the second power calibration curve A2, S1110.

Meanwhile, depending on the needs, the wireless power receiving device may make the wireless power transmitting device extend the power calibration curve by transmitting a fourth calibration data point to the wireless power transmitting device. In this case, the wireless power receiving device may transmit the fourth calibration point, one of the consecutive calibration points, to the wireless power transmitting device by again using the second received power packet (RP/2).

The wireless power receiving device transmits a new second received power packet (RP/2) including information about the fourth calibration point to the wireless power transmitting device; the wireless power transmitting device transmits ACK or NAK based on a control error value included in the control error packet. Since specific descriptions about the operation above are similar to what has been given about transmission of the second received power packet (RP/2) including information about the third calibration point, detailed descriptions thereof will be omitted.

Referring to FIG. 16, when a power calibration curve is constructed based on four calibration data points included in a received power packet in response to which ACK is transmitted, the wireless power transmitting device may construct a first power calibration curve A1 connecting the first calibration data point (Pt1, RP/1) and the second calibration data point (Pt2, RP/2), a second power calibration curve A2 connecting the second calibration data point (Pt2, RP/2) and the third calibration data point (Pt3, RP/2), and a third power calibration curve A3 connecting the third calibration data point (Pt3, RP/2) and the fourth calibration data point (Pt4, RP/2); and perform foreign object detection using the constructed power calibration curves.

In a similar way, the wireless power receiving device and the wireless power transmitting device may construct a multi-point power calibration curve using one first received power packet (RP/1) and a plurality of second received power packets (RP/2).

Meanwhile, a calibration time-out may be configured for the power calibration protocol. This is intended to prevent a foreign object from being inserted while the power calibration protocol is proceeding.

The calibration time-out may include calibration time-out of the wireless power receiving device (PRx calibration time-out) and calibration time-out of the wireless power transmitting device (PTx calibration time-out).

The calibration time-out of the wireless power receiving device refers to the time during which the wireless power receiving device performs power calibration, which, for example, may be defined as the time required to transmit RP/0 or RP/4 after transmission of the first RP/1. For example, the calibration time-out of the wireless power receiving device may be configured to be 16 seconds.

The calibration time-out of the wireless power transmitting device may be defined as the time required to transmit the first ACK in response to RP/2 after the wireless power transmitting device receives the first RP/1. The calibration time-out of the wireless power transmitting device may be smaller than the calibration time-out of the wireless power receiving device, which, for example, may be configured to be 10 seconds.

Figure 17:
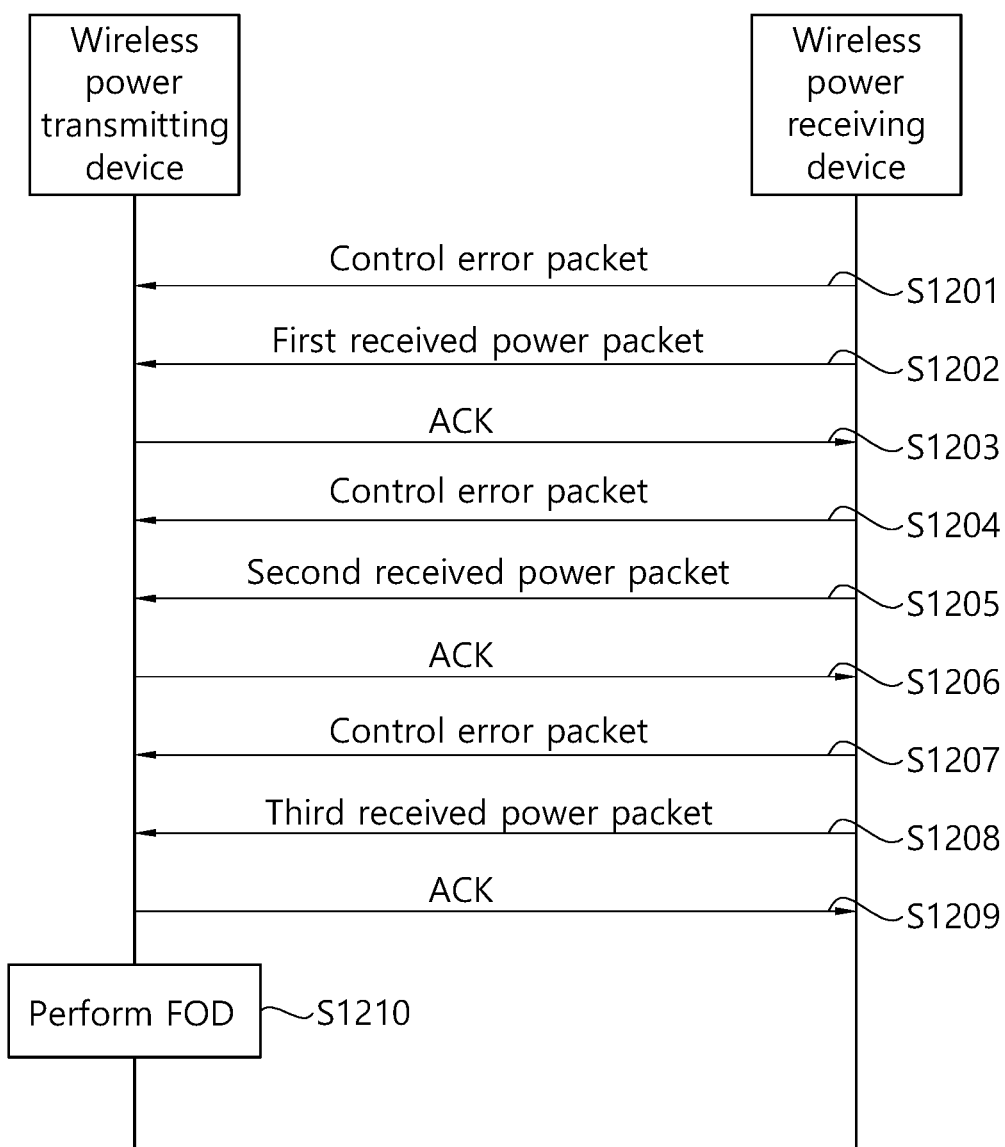
FIG. 17 is a state diagram illustrating a multi-point power calibration method using RP/3 according to one embodiment.
Figure 18:
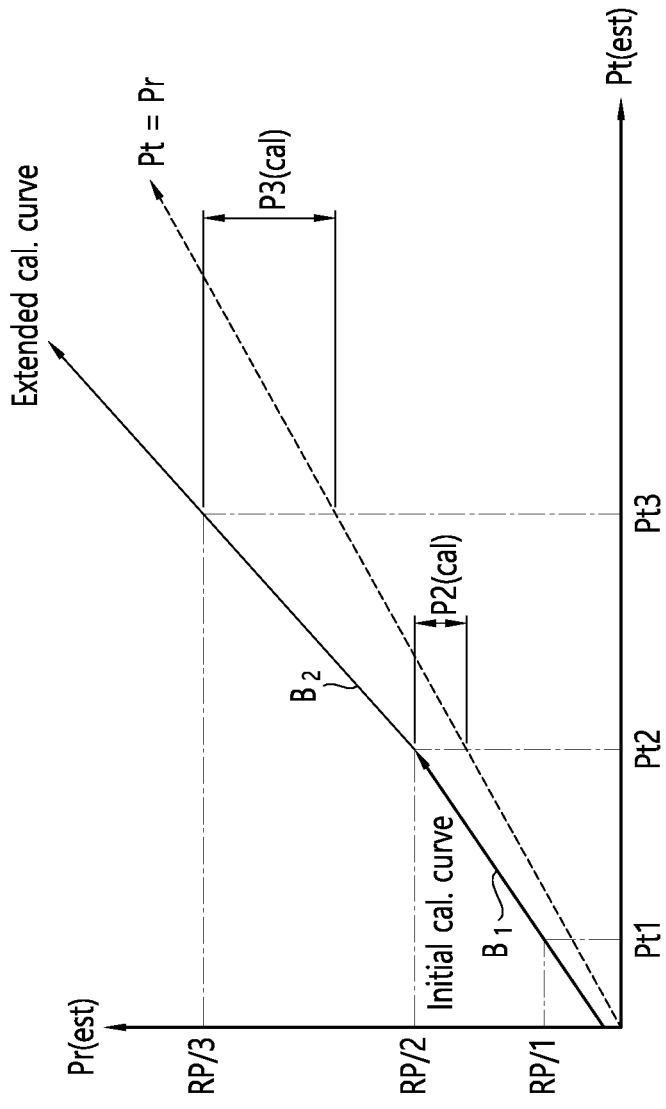
FIG. 18 is a graph illustrating a power calibration curve according to a multi-point power calibration method using RP/3 according to one embodiment.

FIG. 17 is a state diagram illustrating a multi-point power calibration method using RP/3 according to one embodiment, and FIG. 18 is a graph illustrating a power calibration curve according to a multi-point power calibration method using RP/3 according to one embodiment.

Referring to FIG. 17, S1201 to S1206 steps of the multi-point power calibration protocol that extends a power calibration curve using RP/3 are the same as the S1101 to S1106 steps of FIG. 12. Therefore, detailed descriptions thereof will be omitted.

However, different from the embodiments described with reference to FIGS. 12 to 16, when transmission of consecutive calibration points is needed, a wireless power receiving device according to the present embodiment transmits a third calibration point, one of the consecutive calibration points, by using the third received power packet (RP/3) rather than the second received power packet (RP/2).

The third received power packet (RP/3) may have the same format as those of the first received power packet (RP/1) and the second received power packet (RP/2) (see FIG. 13). However, the mode field of the third received power packet (RP/3) may have a different value from the mode field values of the first received power packet (RP/1) and the second received power packet (RP/2). For example, the mode field of the first received power packet (RP/1) may have a value of 1 ('001'b), the mode field of the second received power packet (RP/2) may have a value of 2 ('010' b), and the mode field of the third received packet (RP/3) may have a value of 3 ('011' b).

In other words, after the S1206 step, when transmission of consecutive calibration points is required, the wireless power receiving device transmits the third received power packet (RP/3) including information about the third calibration point to the wireless power transmitting device S1208.

Meanwhile, the wireless power receiving device transmits a CE packet to the wireless power transmitting device S1207. The wireless power transmitting device determines, based on a control error value included in the CE packet, whether the wireless power receiving device has reached a desired target operating point and responds with ACK or NAK in response to the third received power packet (RP/3).

When the control error value is less than or equal to a predetermined level, the wireless power transmitting device determines that the power level is stable and the wireless power receiving device has reached a desired target operating point; and responds with ACK in response to the third received power packet (RP/3) S1209. When the control error value is larger than or equal to a predetermined level, the wireless power transmitting device determines that the power level is unstable and the wireless power receiving device has not yet reached a desired target operating point; and may respond with NAK in response to the third received power packet (RP/3).

The wireless power receiving device continues to transmit the third received power packet (RP/3) until it receives ACK from the wireless power transmitting device S1208. Also, to stabilize the power level at the third calibration data point, the wireless power receiving device also transmits a control error packet repeatedly to the wireless power transmitting device S1207.

Referring to FIG. 18, the wireless power transmitting device constructs a power calibration curve based on calibration data points included respectively in the first received power packet (RP/1), the second received power packet (RP/2), and the third received power packet (RP/3) in response to which ACK is transmitted.

When the power calibration curve is constructed based on three calibration data points, the wireless power transmitting device may construct a first power calibration curve B1 connecting the first calibration data point (Pt1, RP/1) and the second calibration data point (Pt2, RP/2) and a second power calibration curve B2 connecting the second calibration data point (Pt2, RP/2) and the third calibration data point (Pt3, RP/3) may be constructed.

The first power calibration curve B1 and the second power calibration curve B2 may be defined as first-order functions having different slopes and y-intercepts, and the wireless power transmitting device performs foreign object detection due to a loss of transmitted power using a received power value confirmed by using a received power packet received from the wireless power receiving device, a transmitted power value, and a power calibration curve including the first power calibration curve B1 and the second power calibration curve B2, S1210.

As described above, since a power calibration curve may be extended, the calibration range is increased so that a broader range of power values may be calibrated, and since the calibration reliability is improved, the reliability of foreign object detection based on power loss is also increased.

In what follows, a multi-point power calibration method for re-calibrating a power calibration curve will be described.

Figure 19:
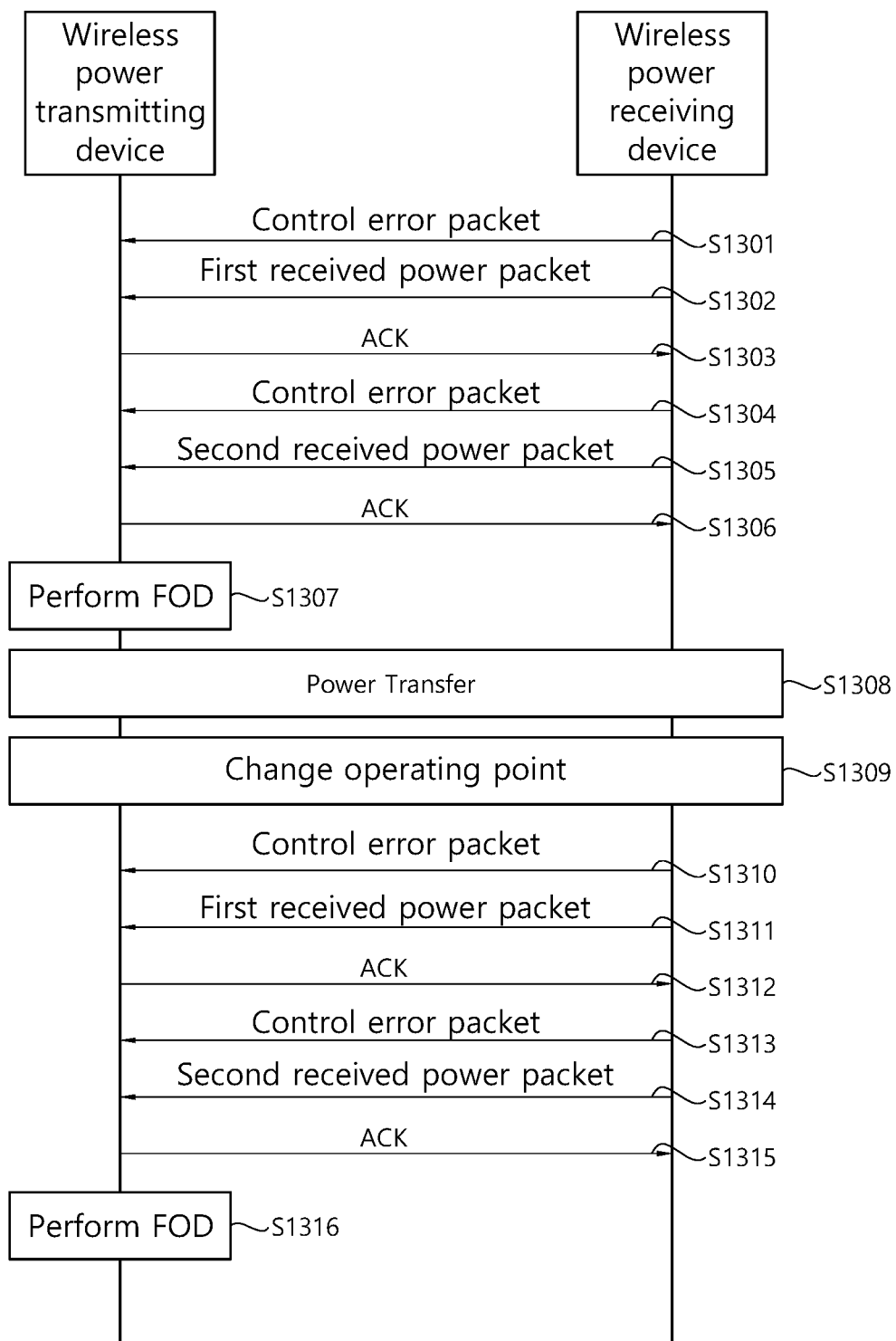
FIG. 19 is a flow diagram illustrating a power re-calibration method according to one embodiment.
Figure 20:
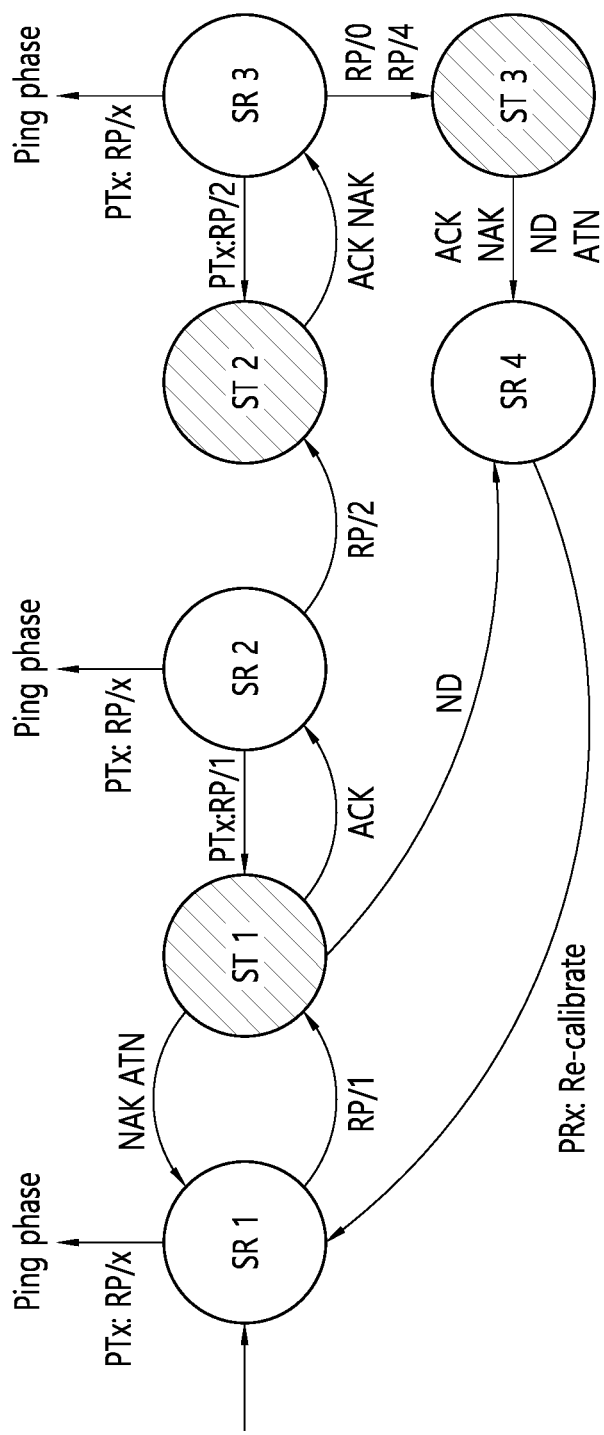
FIG. 20 is a state diagram illustrating a power re-calibration method according to one embodiment.
Figure 21:
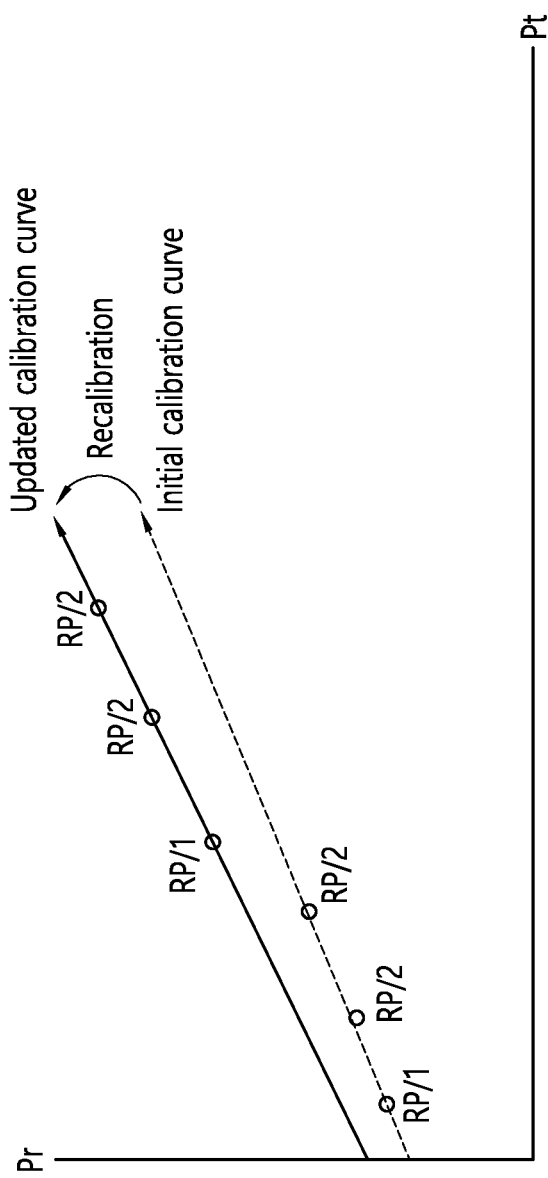
FIG. 21 is a graph illustrating a power calibration curve according to a power re-calibration method according to one embodiment.

FIG. 19 is a flow diagram illustrating a power re-calibration method according to one embodiment, FIG. 20 is a state diagram illustrating a power re-calibration method according to one embodiment, and FIG. 21 is a graph illustrating a power calibration curve according to a power re-calibration method according to another embodiment.

A power re-calibration protocol according to one embodiment may be distinguished by an initial calibration protocol and a follow-up calibration protocol. Referring to FIG. 19, the initial calibration protocol includes the S1301 to S1306 steps, and the follow-up calibration protocol includes the S1310 to S1315 steps.

The S1301 to S1306 steps of the initial calibration protocol are the same as the S1101 to S1106 steps of FIG. 12. Therefore, detailed descriptions thereof will be omitted.

Although the initial calibration protocol shown in FIG. 19 uses the two-point calibration protocol constructing a power calibration curve based on two calibration data points, the initial calibration protocol may use the multi-point calibration protocol constructing a power calibration curve based on three or more calibration data points described with reference to FIGS. 12 to 18.

Suppose RP/0 or RP/4 is transmitted to terminate the initial calibration protocol since transmission of consecutive calibration points is no longer needed after ACK is received in response to the second received power packet (RP/2) including information about the second calibration data point transmitted by the wireless power receiving device; in this case, the initial calibration protocol proceeds using the two-point calibration protocol.

Meanwhile, when transmission of consecutive calibration points is needed after ACK is received in response to the second received power packet (RP/2) including information about the second calibration data point transmitted by the wireless power receiving device and the second or third received power packet including information about the third calibration data point is transmitted, the initial calibration protocol proceeds based on the multi-point calibration protocol.

If the initial calibration protocol is completed, the wireless power transmitting device constructs a power calibration curve according to the initial calibration protocol and performs foreign object detection based on the power calibration curve S1307.

When it is determined from the result of foreign object detection that a foreign object does not exist, the power transfer phase is carried out, and the wireless power transmitting device transmits wireless power to the wireless power receiving device S1308. For the convenience of description, FIG. 19 illustrates a situation where the power transfer phase is carried out after the S1307 step; however, the initial calibration protocol may be carried out from the start of the power transfer phase.

When the wireless power receiving device changes a target operating point (for example, a target rectified voltage) in the middle of wireless power transfer S1309, a follow-up calibration protocol is carried out, and the wireless power receiving device transmits anew first received power packet (RP/1) including information about a new first calibration data point to the wireless power transmitting device (S1311, SR4→SR1). Referring to FIG. 21, for example, the wireless power receiving device may change the target operating point from a first operating point (5V) to a second operating point (12V).

The new first received power packet (RP/1) also has the same format as other received power packets. The new first received power packet (RP/1) has the same mode field value as the first received power packet (RP/1) transmitted in the S1302 step. However, since the new first received power packet (RP/1) includes information about calibration data points different from the information included in the first received power packet (RP/1) transmitted in the S1302 step, the value of the estimated received power value field may be different from that of the first received power packet (RP/1) transmitted in the S1302 step.

The wireless power transmitting device may confirm, through the value of the mode field of the new first received power packet (RP/1), that the received power packet (RP) received from the wireless power receiving device is a new first received power packet (RP/1) including information about a new first calibration data point and may confirm the new first calibration data point through the value of the estimated received power value field of the new first received power packet (RP/1). The new first calibration data point becomes a start point of a power calibration curve updated through the re-calibration protocol.

Meanwhile, the wireless power receiving device transmits a CE packet to the wireless power transmitting device S1310. The wireless power transmitting device determines, based on a control error value included in the CE packet, whether the wireless power receiving device has reached a desired target operating point and responds with ACK or NAK in response to the new second received power packet (RP/2) ST2. Since detailed descriptions related to the above have already been given, they will be omitted.

The wireless power receiving device continues to transmit the new first received power packet (RP/1) and the control error packet S1310, S1311 until it receives ACK from the wireless power transmitting device S1312.

After receiving ACK from the wireless power transmitting device in response to the new first received power packet (RP/1), the wireless power receiving device transmits the new second received power packet (RP/2) including information about the new second calibration data point to the wireless power transmitting device S1314, SR2.

The new second received power packet (RP/2) also has the same format as other received power packets. The new second received power packet (RP/2) has the same mode field value as the second received power packet (RP/2) transmitted in the S1305 step. However, since the new second received power packet (RP/2) includes information about calibration data points different from the information included in the second received power packet (RP/2) transmitted in the S1305 step, the value of the estimated received power value field may be different from that of the second received power packet (RP/2) transmitted in the S1305 step.

The wireless power transmitting device may confirm, through the value of the mode field of the new second received power packet (RP/2), that the received power packet (RP) received from the wireless power receiving device is a new second received power packet (RP/2) including information about a new second calibration data point and may confirm the new second calibration data point through the value of the estimated received power value field of the new second received power packet (RP/2). The new second calibration data point constitutes a point for constructing a power calibration curve updated through the re-calibration protocol.

Meanwhile, the wireless power receiving device transmits a CE packet to the wireless power transmitting device S1313. The wireless power transmitting device determines, based on a control error value included in the CE packet, whether the wireless power receiving device has reached a desired target operating point and responds with ACK or NAK in response to the new second received power packet (RP/2) ST2. Since detailed descriptions related to the above have already been given, they will be omitted.

The wireless power receiving device continues to transmit the new second received power packet (RP/2) and the control error packet S1313, S1314 until it receives ACK from the wireless power transmitting device S1315.

After receiving ACK in response to the new second received power packet (RP/2), the wireless power receiving device may determine whether it is necessary to transmit consecutive calibration data points.

When transmission of consecutive calibration points is not required, the wireless power receiving device may transmit a received power packet (RP/0 or RP/4), of which the mode field has a value different from those of the first received power packet (RP/1) and the second received power packet (RP/2), so that the power calibration protocol may be terminated and normal power transmission may resume SR3.

The wireless power transmitting device updates the power calibration curve based on the new first and second calibration points received through the follow-up calibration protocol and performs foreign object detection using the updated power calibration curve S1316.

Although FIG. 19 illustrates an example in which the follow-up calibration protocol also proceeds based on the two-point calibration protocol for the convenience of descriptions, when the wireless power receiving device transmits the second or third received power packet including information about the third calibration data point accordingly as transmission of consecutive calibration points is needed after the S1315 step, the follow-up calibration protocol proceeds based on the multi-point calibration protocol. In this case, the wireless power transmitting device performs foreign object detection using a power calibration curve updated according to the multi-point calibration protocol S1316.

Referring to FIG. 21, an initial calibration curve is constructed accordingly as the initial calibration protocol proceeds at the first operating point (5V) based on the multi-point calibration protocol using one RP/1 and a plurality of RP/2s described with reference to FIG. 12. Afterwards, the operating point is changed to the second operating point (12V), and the power calibration curve is updated accordingly as the follow-up calibration protocol also proceeds at the second operating point based on the multi-point calibration protocol using one RP/1 and a plurality of RP/2s.

According to the power re-calibration method, when the wireless power receiving device changes an operating point (for example, a target rectified voltage) during power transmission, power re-calibration may be performed without resetting the wireless power transmitting device.

Therefore, by resetting the wireless power transmitting device, charging time for the wireless power receiving device may be prevented from being elongated, and since an update of the power calibration curve due to the change of the operating point is made possible, reliability of foreign object detection is also increased.

In the above, a multi-point power calibration method extending a power calibration curve and a multi-point power calibration method re-calibrating the power calibration curve have been described. In what follows, a power calibration method combining the multi-point power calibration method extending a power calibration curve and the multi-point power calibration method re-calibrating the power calibration curve will be described.

Figure 22:
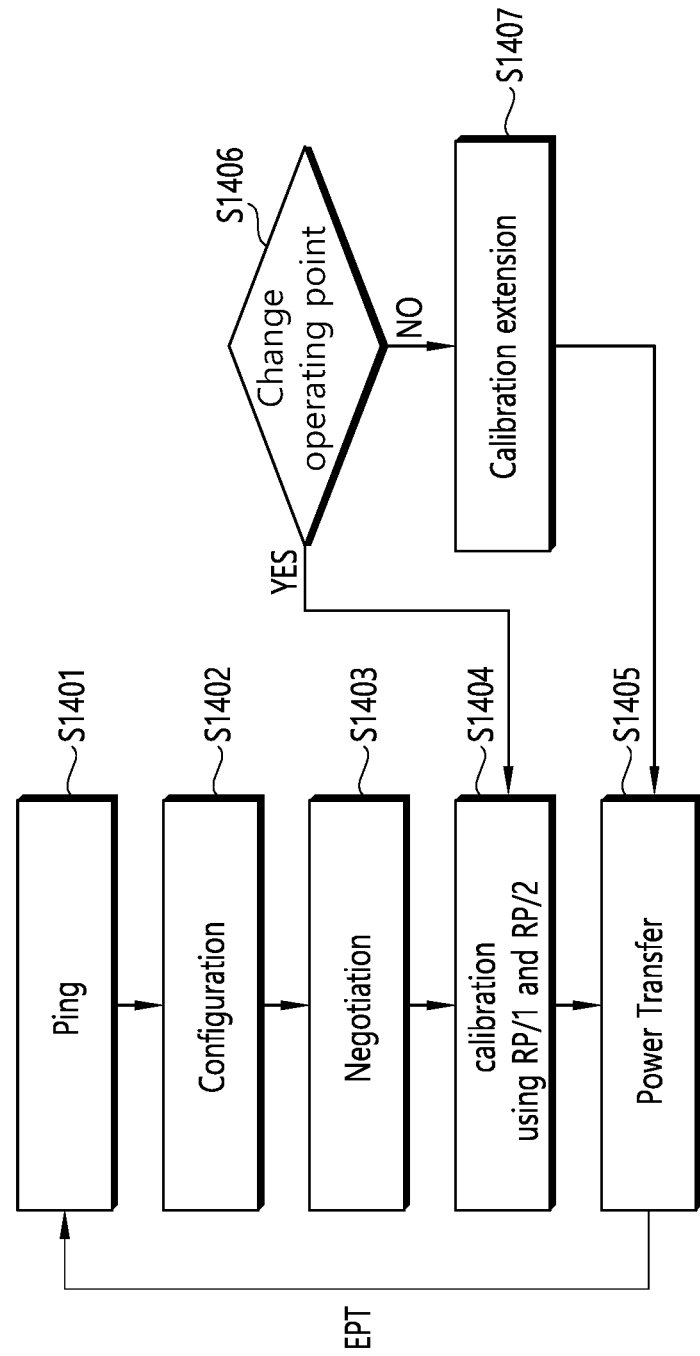
FIG. 22 is a flow diagram illustrating a power calibration method according to one embodiment.

FIG. 22 is a flow diagram illustrating a power calibration method according to one embodiment.

Referring to FIG. 22, the wireless power transmitting device and the wireless power receiving device go through the ping phase S1401, the configuration phase S1402, and the negotiation phase S1403; and proceed with a calibration protocol. The wireless power receiving device transmits a first calibration data point and a second calibration data point to the wireless power transmitting device by transmitting the first received power packet (RP/1) and the second received power packet (RP/2) S1404.

The wireless power transmitting device constructs a calibration curve using the first calibration data point and the second calibration data point of the first received power packet (RP/1) and the second received power packet (RP/2)

in response to which ACK is transmitted; transmits wireless power based on the calibration curve S1405; and performs foreign object detection.

Afterwards, as the wireless power receiving device changes a target operating point (for example, a target rectified voltage), a multi-point power calibration method extending the power calibration curve or a multi-point power calibration method re-calibrating (or updating) the power calibration curve is used for further progress.

When the wireless power receiving device does not change the target operating point S1406 and it is necessary to transmit consecutive calibration points, a multi-point power calibration method extending the power calibration curve is used for further progress S1407. As described above, the multi-point power calibration method extending the power calibration curve transmits the third calibration data point to the wireless power transmitting device using a new second received power packet (RP/2) or a third received power packet (RP/3). The wireless power transmitting device constructs a power calibration curve using the first and second calibration data points received in the S1404 step and the third calibration data point received in the S1407 step.

Meanwhile, when the wireless power receiving device changes the target operating point S1406, the multi-point power calibration method re-calibrating (or updating) the power calibration curve is used. As described above, the multi-point power calibration method re-calibrating (or updating) the power calibration curve transmits new first and second calibration data points to the wireless power transmitting device using the new first received power packet (RP/1) and the new second received power packet (RP/2). The wireless power transmitting device re-calibrates (or updates) the power calibration curve using newly received first and second calibration data points.

In other words, the wireless power receiving device and the wireless power transmitting device proceed with a calibration protocol extending an existing power calibration curve or a calibration protocol updating the existing power calibration curve depending on whether the target operating point is changed.

The wireless power transmitting device according to the embodiments of FIGS. 10 to 22 corresponds to the wireless power transmitting device or the wireless power transmitter or the power transmitting unit disclosed in FIGS. 1 to 9. Therefore, the operation of the wireless power transmitting device according to the present embodiment is implemented by a combination of one or two or more of the constituting elements of the wireless power transmitting device of FIGS. 1 to 9. For example, the communication/control unit 120 may perform reception of data packets for foreign object detection by the wireless power transmitting device, construction of a power calibration curve, extension and/or update, execution of a foreign object detection method, transmission of ACK/NAK due to the result of the foreign object detection, and so on.

Also, the wireless power receiving device according to the embodiments of FIGS. 10 to 22 corresponds to the wireless power receiving device or the wireless power receiver or the power receiving unit disclosed in FIGS. 1 to 9. Therefore, the operation of the wireless power receiving device according to the present embodiment is implemented by a combination of one or two or more of the constituting elements of the wireless power receiving device of FIGS. 1 to 9. For example, the communication/control unit 220 may perform transmission of data packets for foreign object detection by the wireless power receiving device, reception of ACK/NAK due to the result of the foreign object detection, and so on.

Since the wireless power transmitting method and apparatus or the wireless power receiver and method according to an embodiment of the present disclosure do not necessarily include all the elements or operations, the wireless power transmitter and method and the wireless power transmitter and method may be performed with the above-mentioned components or some or all of the operations. Also, embodiments of the above-described wireless power transmitter and method, or receiving apparatus and method may be performed in combination with each other. Also, each element or operation described above is necessarily performed in the order as described, and an operation described later may be performed prior to an operation described earlier.

The description above is merely illustrating the technical spirit of the present disclosure, and various changes and modifications may be made by those skilled in the art without departing from the essential characteristics of the present disclosure. Therefore, the embodiments of the present disclosure described above may be implemented separately or in combination with each other.

Therefore, the embodiments disclosed in the present disclosure are intended to illustrate rather than limit the scope of the present disclosure, and the scope of the technical spirit of the present disclosure is not limited by these embodiments. The scope of the present disclosure should be construed by claims below, and all technical spirits within a range equivalent to claims should be construed as being included in the right scope of the present disclosure.

What is claimed is:

1. In a wireless power transmitting device transmitting wireless power to a wireless power receiving device, the wireless power transmitting device configured to:
   receive a first received power packet including an estimated received power value for a first calibration data point from the wireless power receiving device after a negotiation phase;
   transmit ACK in response to the first received power packet;
   receive a second received power packet including an estimated received power value for a second calibration data point from the wireless power receiving device;
   transmit ACK in response to the second received power packet;
   receive a new second received power packet including an estimated received power value for a third calibration data point from the wireless power receiving device;
   transmit ACK in response to the new second received power packet; and
   construct a power calibration curve based on the first received power packet, the second received power packet, and the new second received power packet.

2. The wireless power transmitting device of claim 1, further configured to receive a control error packet including a control error value from the wireless power receiving device and transmit ACK in response to the first received power packet, the second received power packet, and the new second received power packet based on the control error value.

3. The wireless power transmitting device of claim 1, further configured to calculate a power loss value of the wireless power transmitted to the wireless power receiving device based on the power calibration curve and detect a foreign object existing between the wireless power transmitting device and the wireless power receiving device using the power loss value.

4. The wireless power transmitting device of claim 1, wherein the first received power packet, the second received power packet, and the new second received power packet have the same packet structure including a mode field; and
the mode field of the first received power packet has a value different from those of the mode fields of the second received power packet and the new second received power packet.

5. The wireless power transmitting device of claim 4, wherein mode fields of the second received power packet and the new second received power packet have the same value.

6. In a wireless power receiving device receiving wireless power from a wireless power transmitting device, the wireless power receiving device configured to:
transmit a first received power packet including an estimated received power value for a first calibration data point to the wireless power transmitting device after a negotiation phase;
receive ACK in response to the first received power packet from the wireless power transmitting device;
transmit a second received power packet including an estimated received power value for a second calibration data point to the wireless power transmitting device;
receive ACK in response to the second received power packet from the wireless power transmitting device;
transmit a new second received power packet including an estimated received power value for a third calibration data point to the wireless power transmitting device; and
receive ACK in response to the new second received power packet from the wireless power transmitting device.

7. The wireless power receiving device of claim 6, further configured to continue to transmit the first received power packet until ACK is received in response to the first received power packet from the wireless power transmitting device.

8. The wireless power receiving device of claim 6, further configured to continue to transmit the second received power packet until ACK is received in response to the second received power packet from the wireless power transmitting device.

9. The wireless power receiving device of claim 6, further configured to continue to transmit the new second received power packet until ACK is received in response to the new second received power packet from the wireless power transmitting device.

10. The wireless power receiving device of claim 6, further configured to transmit a control error packet including a control error value to the wireless power transmitting device and receive, from the wireless power transmitting device, ACK in response to the first received power packet, the second received power packet, and the new second received power packet based on the control error value.

11. The wireless power receiving device of claim 6, further configured to terminate a power calibration protocol by transmitting a received power packet including an estimated received power value for a normal value to the wireless power transmitting device.

12. The wireless power receiving device of claim 6, wherein the first received power packet, the second received power packet, and the new second received power packet have the same packet structure including a mode field; and the mode field of the first received power packet has a value different from those of the mode fields of the second received power packet and the new second received power packet.

13. The wireless power receiving device of claim 6, wherein mode fields of the second received power packet and the new second received power packet have the same value.

14. In a wireless power receiving device receiving wireless power from a wireless power transmitting device, the wireless power receiving device configured to:
transmit a first received power packet including an estimated received power value for a first calibration data point to the wireless power transmitting device after a negotiation phase;
receive ACK in response to the first received power packet from the wireless power transmitting device;
transmit a second received power packet including an estimated received power value for a second calibration data point to the wireless power transmitting device;
receive ACK in response to the second received power packet from the wireless power transmitting device; and
based on change of a target operating point, transmit a new second received power packet including an estimated received power value for a third calibration data point to the wireless power transmitting device or transmit a new first received power packet including an estimated received power value for a new first calibration data point and a new second received power packet including an estimated received power value for a new second calibrated data point to the wireless power transmitting device.

15. The wireless power receiving device of claim 14, further configured to do not changing the target operating point;
transmit the new second received power packet including an estimated received power value for the third calibration data point; and
receive ACK in response to the new second received power packet including the estimated received power value for the third calibration data point from the wireless power transmitting device.

16. The wireless power receiving device of claim 15, further configured to continue to transmit the new second received power packet including the estimated received power value for the third calibration data point until ACK is received in response to the new second received power packet including the estimated received power value for the third calibration data point from the wireless power transmitting device.

17. The wireless power receiving device of claim 14, further configured to change the target operating point;
transmit the new first received power packet;
receive ACK in response to the new first received power packet from the wireless power transmitting device;
transmit the new second received power packet including the estimated received power value for the new second calibration data point; and
receive ACK in response to the new second received power packet including the estimated received power value for the new second calibration data point from the wireless power transmitting device.

18. The wireless power receiving device of claim 17, further configured to continue to transmit the new first received power packet until ACK is received in response to the new first received power packet from the wireless power transmitting device and continue to transmit the new second received power packet including the estimated received power value for the new second calibration data point until ACK is received in response to the new second received power packet including the estimated received power value for the new second calibration data point from the wireless power transmitting device.

19. The wireless power receiving device of claim 14, wherein the first received power packet, the second received power packet, the new first received power packet, and the new second received power packet have the same packet structure including a mode field; and the mode fields of the first received power packet and the new first received power packet have a value different from those of the mode fields of the second received power packet and the new second received power packet.

20. The wireless power receiving device of claim 19, wherein mode fields of the first received power packet and the new first received power packet have the same value, and mode fields of the second received power packet and the new second received power packet have the same value.

* * * * *